(12) United States Patent
Chong et al.

(10) Patent No.: US 9,819,966 B2
(45) Date of Patent: Nov. 14, 2017

(54) FILTER DESCRIPTION SIGNALING FOR MULTI-FILTER ADAPTIVE FILTERING

(75) Inventors: In Suk Chong, San Diego, CA (US); Marta Karczewicz, San Diego, CA (US); Wei-Jung Chien, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 859 days.

(21) Appl. No.: 13/178,415

(22) Filed: Jul. 7, 2011

(65) Prior Publication Data

US 2012/0051438 A1    Mar. 1, 2012

Related U.S. Application Data

(60) Provisional application No. 61/379,253, filed on Sep. 1, 2010, provisional application No. 61/392,853, filed
(Continued)

(51) Int. Cl.
*H04N 7/26* (2006.01)
*H04N 7/32* (2006.01)
(Continued)

(52) U.S. Cl.
CPC ........... *H04N 19/85* (2014.11); *H04N 19/117* (2014.11); *H04N 19/14* (2014.11); *H04N 19/176* (2014.11);
(Continued)

(58) Field of Classification Search
CPC ...... H04N 19/00587; H04N 7/26; H04N 7/32; H04N 19/00549
(Continued)

(56) References Cited

U.S. PATENT DOCUMENTS 6,504,873 B1    1/2003   Vehvilaeinen
6,847,684 B1    1/2005   Hsu
(Continued)

FOREIGN PATENT DOCUMENTS

CN    101543076 A    9/2009
CN    101796847 A    8/2010
(Continued)

OTHER PUBLICATIONS

"Test Model under Consideration", Joint Collaborative Team on Video Coding (JCT-VC) of ITU-T SG16 WP3 and ISO/IEC JTC1/SC29/WG11, Document: JCTVC-B205, Status: Output Document (draft000), Jul. 21-28, 2010, 152 pp. Internet<URL:http://phenix.int-evry.fr/jct/doc_end_user/documents/20_Geneva/wg11/JCTVC-B205.zip>.
(Continued)

*Primary Examiner* — Jeremaiah C Hallenbeck-Huber
*Assistant Examiner* — Albert Kir

(57) ABSTRACT

Filtering is applied at an encoder, and filter information describing a set of filters is encoded in the bitstream to enable a decoder to identify the filtering that was applied at the encoder. The decoder receives encoded video data that includes the filter information, decodes the video data, and applies filtering based on the filtering information. The decoder applies the same filtering that was applied at the encoder. To potentially reduce the number of bits needed to reconstruct the set of filters and other filter information as well as to potentially improve decoder performance, filter description syntax describing the set of filters can be included in the bitstream. The filter description syntax may identify a number of filters in a set of filters, a maximum number of filters in a set of filters, and/or identify a shape of filters in a set of filters.

43 Claims, 9 Drawing Sheets

Related U.S. Application Data on Oct. 13, 2010, provisional application No. 61/487,231, filed on May 17, 2011.

(51) Int. Cl.

| | |
|---|---|
| *H04N 19/17* | (2014.01) |
| *H04N 19/85* | (2014.01) |
| *H04N 19/176* | (2014.01) |
| *H04N 19/70* | (2014.01) |
| *H04N 19/46* | (2014.01) |
| *H04N 19/117* | (2014.01) |
| *H04N 19/14* | (2014.01) |
| *H04N 19/182* | (2014.01) |
| *H04N 19/82* | (2014.01) |
| *H04N 19/42* | (2014.01) |

(52) U.S. Cl.
CPC .......... *H04N 19/182* (2014.11); *H04N 19/42* (2014.11); *H04N 19/46* (2014.11); *H04N 19/70* (2014.11); *H04N 19/82* (2014.11)

(58) Field of Classification Search
USPC ............ 375/240.12, 240.25, 240.13, 240.16, 375/240.29
See application file for complete search history.

(56) References Cited

U.S. PATENT DOCUMENTS

| | | | |
|---|---|---|---|
| 7,372,905 B2 | 5/2008 | Foo et al. | |
| 8,335,392 B2 | 12/2012 | Niedermeier et al. | |
| 8,831,086 B2* | 9/2014 | Ye .................... | H04N 19/00896 375/240 |
| 2002/0172431 A1 | 11/2002 | Atkins et al. | |
| 2003/0219073 A1 | 11/2003 | Lee et al. | |
| 2005/0249293 A1 | 11/2005 | Zeng et al. | |
| 2006/0098734 A1 | 5/2006 | Cho et al. | |
| 2006/0245499 A1 | 11/2006 | Chiu et al. | |
| 2008/0084932 A1 | 4/2008 | Wang et al. | |
| 2008/0089417 A1 | 4/2008 | Bao et al. | |
| 2008/0232452 A1 | 9/2008 | Sullivan et al. | |
| 2009/0175336 A1 | 7/2009 | Karczewicz et al. | |
| 2009/0257664 A1 | 10/2009 | Kao et al. | |
| 2010/0053415 A1 | 3/2010 | Yun | |
| 2010/0092100 A1 | 4/2010 | Madnani | |
| 2010/0098345 A1 | 4/2010 | Andersson et al. | |
| 2010/0104027 A1 | 4/2010 | Youn et al. | |
| 2010/0111431 A1 | 5/2010 | Gharavi-Alkhansari et al. | |
| 2010/0142844 A1 | 6/2010 | Pereira et al. | |
| 2010/0150229 A1* | 6/2010 | Francois et al. ......... | 375/240.12 |
| 2010/0158103 A1 | 6/2010 | Ye et al. | |
| 2010/0177822 A1 | 7/2010 | Karczewicz et al. | |
| 2010/0254448 A1 | 10/2010 | Xu et al. | |
| 2010/0254450 A1 | 10/2010 | Narroschke et al. | |
| 2010/0278267 A1* | 11/2010 | Lai et al. ................ | 375/240.16 |
| 2010/0329361 A1 | 12/2010 | Choi et al. | |
| 2011/0026600 A1 | 2/2011 | Kenji | |
| 2012/0044986 A1 | 2/2012 | Chong et al. | |
| 2012/0051425 A1 | 3/2012 | Chong et al. | |
| 2013/0034159 A1* | 2/2013 | Siekmann et al. ....... | 375/240.12 |
| 2013/0208794 A1* | 8/2013 | Jeong et al. ............ | 375/240.13 |

FOREIGN PATENT DOCUMENTS

| | | |
|---|---|---|
| EP | 1841230 A1 | 10/2007 |
| EP | 2048886 A1 | 4/2009 |
| EP | 2141927 A1 | 1/2010 |
| WO | 2009088976 A1 | 7/2009 |
| WO | 2010001614 A1 | 1/2010 |
| WO | 2010083438 A2 | 7/2010 |

OTHER PUBLICATIONS

Chujoh et al., "Description of video coding technology proposal by TOSHIBA", Joint Collaborative Team on Video Coding (JCT-VC) of ITU-T SG16 WP3 and ISO/IEC JTC1/SC29/WG11, Document: JCTVC-A117, Status: Input Document to JCT-VC, Apr. 15-23, 2010, 36 pp. Internet<URL:http://phenix.int-evry.fr/jct/doc_end_user/documents/1_Dresden/wg11/JCTVC-A117.zip>.

Chujoh et al., "Specification and experimental results of Quadtree-based Adaptive Loop Filter", ITU—Telecommunications Standardization Sector Study Group 16 Question 6 Video Coding Experts Group (VCEG), Document: VCEG-AK22, Purpose: Proposal, Apr. 15-18, 2009, 11 pp. Internet<URL:http://wftp3.itu.int/av-arch/video-site/0904_Yok/VCEG-AK22.zip>.

Huang et.al., "A Technical Description of MediaTek's Proposal to the JCT-VC CfP", Joint Collaborative Team on Video Coding (JCT-VC) of ITU-T SG16 WP3 and ISO/IEC JTC1/SC29/WG11, Document: JCTVC-A109, Status: Input Document to JCT-VC, Apr. 15-23, 2010, 41 pp. Internet<URL:http://phenix.int-evry.fr/jct/doc_end_user/documents/1_Dresden/wg11/JCTVC-A109.zip>.

Karczewicz et al., "Video Coding Technology Proposal by Qualcomm Inc.", Joint Collaborative Team on Video Coding (JCT-VC) of ITU-T SG16 WP3 and ISO/IEC JTC1/SC29/WG11, Document: JCTVC-A121, Status: Input Document to JCT-VC, Apr. 15-23, 2010, 24 pp. Internet<URL:http://phenix.int-evry.fr/jct/doc_end_user/documents/1_Dresden/wg11/JCTVC-A121.zip>.

Chujoh et al., "Quadtree-based adaptive loop filter," ITU-T SG16 Contribution, C181, Geneva, Jan. 2009, 4 pp.

Ichigaya et al., "Description of video coding technology proposal by NHK and Mitsubishi," Document JCTVC-A122, 1st meeting: Dresden, DE, Apr. 15-23, 2010, 43 pp.

Lee et al., "Enhanced Block-Based Adaptive Loop Filter with Multiple Symmetric Structures for Video Coding," ETRI Journal, vol. 32, No. 4, Aug. 2010, 4 pp.

Karczewicz et al., "A Hybrid Video Codec Based on Extended Block Sized, Recursive Integer Transforms, Improved Interpolation, and Flexible Motion Representation," IS&T/SPIE Electronic Imaging, Jan. 2011, 15 pp.

Lee et al., "Loop-filtering and Post-filtering for Low Bit-rates Moving Picture Coding," ICIP '99, Kobe, Japan, Oct. 24-28, 1999, vol. 1, pp. 94-98.

Karczewicz et al., "Video coding technology proposal by Qualcomm Inc.," Document JCTVC-A121, 1st meeting: Dresden, DE, Apr. 15-23, 2010, 24 pp.

Amonou, I. et al., "Description of video coding technology proposal by France Telecom, NTT, NTT DOCOMO, Panasonic and Technicolor," ITU-T SG16 WP3 and ISO/IEC JTC1/SC29/WG11, Document JCTVC-A114, Dresden, DE, Apr. 15-23, 2010, 42 pp.

Ikai, T., "A parallel adaptive loop filter," TU-T SG16 WP3 and ISO/IEC JTC1/SC29/WG11, Document JCTVC-B064, Geneva, CH, Jul. 21-28, 2010, 11 pp.

Chien et al., "Adaptive Filter Based on Combination of Sum-Modified Laplacian Filter Indexing and Quadtree Partitioning," VCEG Contribution VCEG-AL27r1, London, UK / Geneva, CH, Jul. 2009.

U.S. Appl. No. 13/178,399, filed Jul. 7, 2011, entitled "Multi-Input Adaptive Filter Based on Combination of Sum-Modified Laplacian Filter Indexing and Quadtree Partitioning," Chong et al.

International Search Report and Written Opinion of International Application No. PCT/US2011/049641 dated Dec. 2, 2011, 12 pp.

Karczewicz et al: "Video coding technology proposal by Qualcomm", JCTVC-A121, 1st Meeting: Dresden, DE, Apr. 15-23, 2010, 26 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

(56) References Cited

OTHER PUBLICATIONS

Wiegand et al., "WD3: Working Draft 3 of High-Efficiency Video Coding," Document JCTVC-E603, 5th Meeting: Geneva, CH, Mar. 16-23, 2011, 193 pp.

International Preliminary Report on Patentability from International application No. PCT/2011/049641 dated Dec. 4, 2012, 23 pp.

Second Written Opinion of international application No. PCT/US2011/049641, dated Sep. 13, 2012, 6 pp.

"Tool Experiment 10: In-loop filtering", JCT-VC Meeting; Jul. 21-28, 2010; Geneva; CH (Joint Collaborative Team on Video Coding of ISO/IEC JTC1/SC29/WG11 and ITU-T SG.16); URL: http://wftp3.itu.int/av-arch/jctvc-site/, No. JCTVC-B310, Aug. 30, 2010, XP030007715, ISSN: 0000-0046, 15 pp.

Bossen, "Common test conditions and software reference configurations," Document No. JCTVC-O500, Oct. 7-15, 2010, WG11 No. m18607, Joint Collaborative Team on Video Coding (JCT-VC) of ITU-T SG16 WP3 and ISO/IEC JTC1/SC29/WG11, 3rd Meeting, Guangzhou; CN, Oct. 15, 2010, 4 pp.

Bossen, "Common test conditions and software reference configurations," JCT-VC, Document: JCTVC-B300, Jul. 21-28, 2010, 2nd Meeting: Geneva, CH, Mar. 19, 2012, 12 pp.

Chen, et al., "CE8 Subtest2: A Joint Proposal on Improving the Adaptive Loop Filter in TMuC0.9 by MediaTek, Qualcomm, and Toshiba", JCT-VC Meeting; MPEG Meeting; Jan. 20-28, 2011; Daegu; KR(Joint Collaborative Team on Video Coding of ISO/IECJTC1/SC29/WG11 and ITU-TSG.16); URL: http://wftp3.itu.int/av-arch/jctvc-site/, No. JCTVC-D119, Jan. 15, 2011, 18 pp.

Chong, et al., "Adaptive Loop Filter with Low Encoder Complexity," 3rd Meeting, Oct. 7-15, 2010, Guangzhou, CN; Document of Joint Collaborative Team on Video Coding, JCTVC-C113, Oct. 2, 2010, 4 pp.

Chong, et al., "Encoder complexity analysis and performance report on adaptive loop filter", Joint Collaborative Team on Video Coding (JCT-VC) of ITU-T SG16 WP3 and ISO/IEC JTC1/SC29/WG11, 2nd Meeting: Geneva, CH, Jul. 21-28, 2010, JCTVC-B095_r4, Mar. 19, 2012, 5 pp.

Esenlik, et al., "CE 8: Results for adaptive loop filter using prediction and residual (3-Input-ALF)," Joint Collaborative Team on Video Coding (JCT-VC) of ITU-T SG16 WP3 and ISO/IEC JTC1/SC29/WG11, 4th Meeting: Daegu, KR, Jan. 20-28, 2011, Document: JCTVC-D217_r2, WG11 No. m18977_r2, Jan. 22, 2011, 9 pp.

Fu, et al., "TE10 Subtest3: Quadtree-based Adaptive Offset," 3rd meeting, Oct. 7-15, 2010, Guangzhou, CN; Document of Joint Collaborative Team on Video Coding, JCTVC-C147, Oct. 2, 2010, 6 pp.

Fu, et al., "CE8 Subset3: Picture Quadtree Adaptive Offset (PQAO)," 4th Meeting, Jan. 20-28, 2011, Daegu, KR; Document of Joint Collaborative Team on Video Coding, JCTVC-D122, Jan. 15, 2011, 10 pp.

Huang, et al., "In-Loop Adaptive Restoration," 2nd Meeting, Jul. 21-28, 2010, Geneva, CH; Document of Joint Collaborative Team on Video Coding, JCTVC-B077, Mar. 19, 2012, 11 pp.

McCann, et al., "Samsung's Response to the Call for Proposals on Video Compression Technology," 1st meeting, Dresden, DE, Apr. 15-23, 2010, Joint Collaborative Team on Video Coding (JCT-VC) of ITU-T SG-16 WP3 and ISO/IEC JTC1/SC29/WG11, Document: JCTVC-A124, Mar. 19, 2012, 42 pp.

McCann, "TE12: Summary of evaluation of TMuC tools in TE12," Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, Document: JCTVC-C225, WG11 Number: m18265, Oct. 7, 2010, 14 pp.

Narroschke, "TE12.5: Results for Adaptive loop filter using prediction and residual," Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, Document: JCTVC-C214_r1, WG11 No. m18254, Oct. 7, 2014, 8 pp.

Tan, et al., "Summary of HEVC working draft 1 and HEVC test model (HM)", Joint Collaborative Team on Video Coding (JCT-VC) of ITU-T SG16 WP3 and ISO/IEC JTC1/SC29/WG11, JCTVC-C405, Guangzhou, China, Oct. 7, 2010, 2 pp.

Tsai, et al., "TE10 Subtest2: Coding Unit Synchronous Picture Quadtree-based Adaptive Loop Filter," 3rd Meeting, Oct. 7-15, 2010, Guangzhou, CN; Document of Joint Collaborative Team on Video Coding, JCTVC-C143, Oct. 5, 2010, 12 pp.

Yamakage et al., "TE10 Subtest 2: Reduction of number of encoding passes for quadtree-based adaptive loop filter (QALF)," 3rd Meeting: Guangzhou, CN, Oct. 7-15, 2010, Document: JCTVC-C082, JCT-VC of ITU-T SG16 WP3 and ISO/IEC JTC1/SC29/WG11, Oct. 1, 2010, 5 pp.

Yamakage, et al., "Description of CE8: In-loop filtering", 3rd Meeting, Oct. 7-15, 2010, Guangzhou, CN; JCT-VC of of ITU-T SG16 WP3 and ISO/IEC JTC1/SC29/WG11 JCTVC-C508_r1, Oct. 30, 2010, 14 pp.

* cited by examiner

FILTER DESCRIPTION SIGNALING FOR MULTI-FILTER ADAPTIVE FILTERING

This application claims the benefit of U.S. Provisional Application No. 61/379,253, filed on Sep. 1, 2010, U.S. Provisional Application No. 61/392,853, filed on Oct. 13, 2010, and U.S. Provisional Application No. 61/487,231, filed on May 17, 2011, the entire contents each of which are incorporated herein by reference.

TECHNICAL FIELD

This disclosure relates to block-based digital video coding used to compress video data and, more particularly, techniques for signaling filters for use in the filtering of video blocks.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop computers, desktop computers, tablet computers, digital cameras, digital recording devices, video gaming devices, video game consoles, and the like. Digital video devices implement video compression techniques, such as MPEG-2, MPEG-4, or ITU-T H.264/MPEG-4, Part 10, Advanced Video Coding (AVC), to transmit and receive digital video more efficiently. Video compression techniques perform spatial and temporal prediction to reduce or remove redundancy inherent in video sequences. New video standards, such as the High Efficiency Video Coding (HEVC) standard being developed by the "Joint Collaborative Team-Video Coding" (JCTVC), which is a collaboration between MPEG and ITU-T, continue to emerge and evolve. This new HEVC standard is also sometimes referred to as H.265.

Block-based video compression techniques may perform spatial prediction and/or temporal prediction. Intra-coding relies on spatial prediction to reduce or remove spatial redundancy between video blocks within a given unit of coded video, which may comprise a video frame, a slice of a video frame, or the like. In contrast, inter-coding relies on temporal prediction to reduce or remove temporal redundancy between video blocks of successive coded units of a video sequence. For intra-coding, a video encoder performs spatial prediction to compress data based on other data within the same unit of coded video. For inter-coding, the video encoder performs motion estimation and motion compensation to track the movement of corresponding video blocks of two or more adjacent units of coded video.

A coded video block may be represented by prediction information that can be used to create or identify a predictive block, and a residual block of data indicative of differences between the block being coded and the predictive block. In the case of inter-coding, one or more motion vectors are used to identify the predictive block of data from a previous or subsequent coded unit, while in the case of intra-coding, the prediction mode can be used to generate the predictive block based on data within the coded unit associated with the video block being coded. Both intra-coding and inter-coding may define several different prediction modes, which may define different block sizes and/or prediction techniques used in the coding. Additional types of syntax elements may also be included as part of encoded video data in order to control or define the coding techniques or parameters used in the coding process.

After block-based prediction coding, the video encoder may apply transform, quantization and entropy coding processes to further reduce the bit rate associated with communication of a residual block. Transform techniques may comprise discrete cosine transforms (DCTs) or conceptually similar processes, such as wavelet transforms, integer transforms, or other types of transforms. In a discrete cosine transform process, as an example, the transform process converts a set of pixel values into transform coefficients, which may represent the energy of the pixel values in the frequency domain. Quantization is applied to the transform coefficients, and generally involves a process that limits the number of bits associated with any given transform coefficient. Entropy coding comprises one or more processes that collectively compress a sequence of quantized transform coefficients.

Filtering of video blocks may be applied as part of the encoding and decoding loops, or as part of a post-filtering process on reconstructed video blocks. Filtering is commonly used, for example, to reduce blockiness or other artifacts common to block-based video coding. Filter coefficients (sometimes called filter taps) may be defined or selected in order to promote desirable levels of video block filtering that can reduce blockiness and/or improve the video quality in other ways. A set of filter coefficients, for example, may define how filtering is applied along edges of video blocks or other locations within video blocks. Different filter coefficients may cause different levels of filtering with respect to different pixels of the video blocks. Filtering, for example, may smooth or sharpen differences in intensity of adjacent pixel values in order to help eliminate unwanted artifacts.

SUMMARY

This disclosure describes techniques associated with filtering of video data in a video encoding and/or video decoding process. In accordance with this disclosure, filtering is applied at an encoder, and filter information is encoded in the bitstream to enable a decoder to identify the filtering that was applied at the encoder. The decoder receives encoded video data that includes the filter information, decodes the video data, and applies filtering based on the filtering information. In this way, the decoder applies the same filtering that was applied at the encoder.

According to the techniques of this disclosure, video data can be coded in units referred to as coded units (CUs). Coded units can be partitioned into smaller coded units, or sub-units, using a quadtree partitioning scheme. Syntax identifying the quadtree partitioning scheme for a particular coded unit can be transmitted from an encoder to a decoder. Multiple inputs or a single input associated with each sub-unit can be filtered during the process of decoding and reconstructing the encoded video data. Syntax in the bitstream received by the decoder can identify the filters used at the encoder for a particular sub-unit. The filter used for a particular input can be selected based on activity-metric filter indexing, where certain values for an activity metric are indexed to specific filters within a set of filters. In cases where the activity metric is determined using a sum-modified Laplacian value, the activity-metric filter indexing is sometimes referred to as sum-modified Laplacian indexing or just Laplacian indexing.

Different types of filtering may be applied based on an activity metric determined for the video data. The activity metric may quantify activity associated with one or more blocks of pixels within the video data. The activity metric may comprise a variance metric indicative of pixel variance within a set of pixels. For example, the activity metric may include a sum-modified Laplacian function value, as explained in greater detail below. According to the techniques of this disclosure, a filter unit, such as an adaptive-in loop filter, can be configured to utilize multiple filters based on sum-modified Laplacian filter indexing. As explained in greater detail below, the filtering techniques of this disclosure can be applied to coded units (CUs) of various sizes using a quadtree partitioning scheme. By utilizing multiple filters with Laplacian filter indexing for coded units partitioned using a quadtree partitioning scheme, video coding performance, as measured by one or both of compression rate and reconstructed video quality, might be improved. In some implementations, the filter used for a particular input may be signaled from an encoder to a decoder instead of being determined by the decoder based on an activity metric.

A multi-filter approach, as contemplated in this disclosure, can result in a large number of filters, and hence a large number of filter coefficients needing to be transferred from an encoder to a decoder. Aspects of the present disclosure include transmitting filter description syntax from a video encoder to a video decoder. The filter description syntax can describe a filter or set of filters used by the video encoder to code video data. By including such filter description syntax, the video encoder may be able to transmit filter information using fewer bits and also may improve the operation of a decoder by reducing the number computations needed to apply a particular filter.

In one example, a method of decoding video data includes receiving, at a video decoder, filter description syntax identifying a maximum number of filters to be included in a set of filters; reconstructing the set of filters based on the filter description syntax and additional received filter information; selecting a filter from the set of filters to a coded unit based on an activity metric; and applying the filter.

In another example, a method of video encoding includes determining a maximum number of filters to be included in a set of filters; generating filter description syntax identifying the maximum number of filters; transmitting the filter description syntax to a video decoder; and transmitting the set of filters to the video decoder.

In another example, a video decoding device includes a filter unit configured to receive filter description syntax identifying a maximum number of filters to be included in a set of filters, reconstruct the set of filters based on the filter description syntax and additional received filter information, apply a filter from the set of filters to a coded unit based on an activity metric; and a memory configured to store a filtered result of the filter unit.

In another example, a video encoding device includes a filter unit configure to determine a maximum number of filters to be included in a set of filters and generate filter description syntax identifying the maximum number of filters; and a transmitting unit configure to transmit the filter description syntax to a video decoder and transmit the set of filters to the video decoder.

In another example, an apparatus for decoding video data includes means for receiving filter description syntax identifying a maximum number of filters to be included in a set of filters; means for reconstructing the set of filters based on the filter description syntax and additional received filter information; means for selecting a filter from the set of filters to a coded unit based on an activity metric; and means for applying the filter.

In another example, an apparatus for encoding video data includes means for determining a maximum number of filters to be included in a set of filters; means for generating filter description syntax identifying the maximum number of filters; means for transmitting the filter description syntax to a video decoder; and means for transmitting the set of filters to the video decoder.

The techniques described in this disclosure may be implemented in hardware, software, firmware, or any combination thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer program product comprising a computer-readable storage medium having stored thereon instructions that, when executed, cause one or more processors of a device for decoding video data to receive filter description syntax identifying a maximum number of filters to be included in a set of filters; reconstruct the set of filters based on the filter description syntax and additional received filter information; select a filter from the set of filters to a coded unit based on an activity metric; and apply the filter.

In another example, a computer program product comprising a computer-readable storage medium having stored thereon instructions that, when executed, cause one or more processors of a device for encoding video data to determine a maximum number of filters to be included in a set of filters; generate filter description syntax identifying the maximum number of filters; transmit the filter description syntax to a video decoder; and transmit the set of filters to the video decoder.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
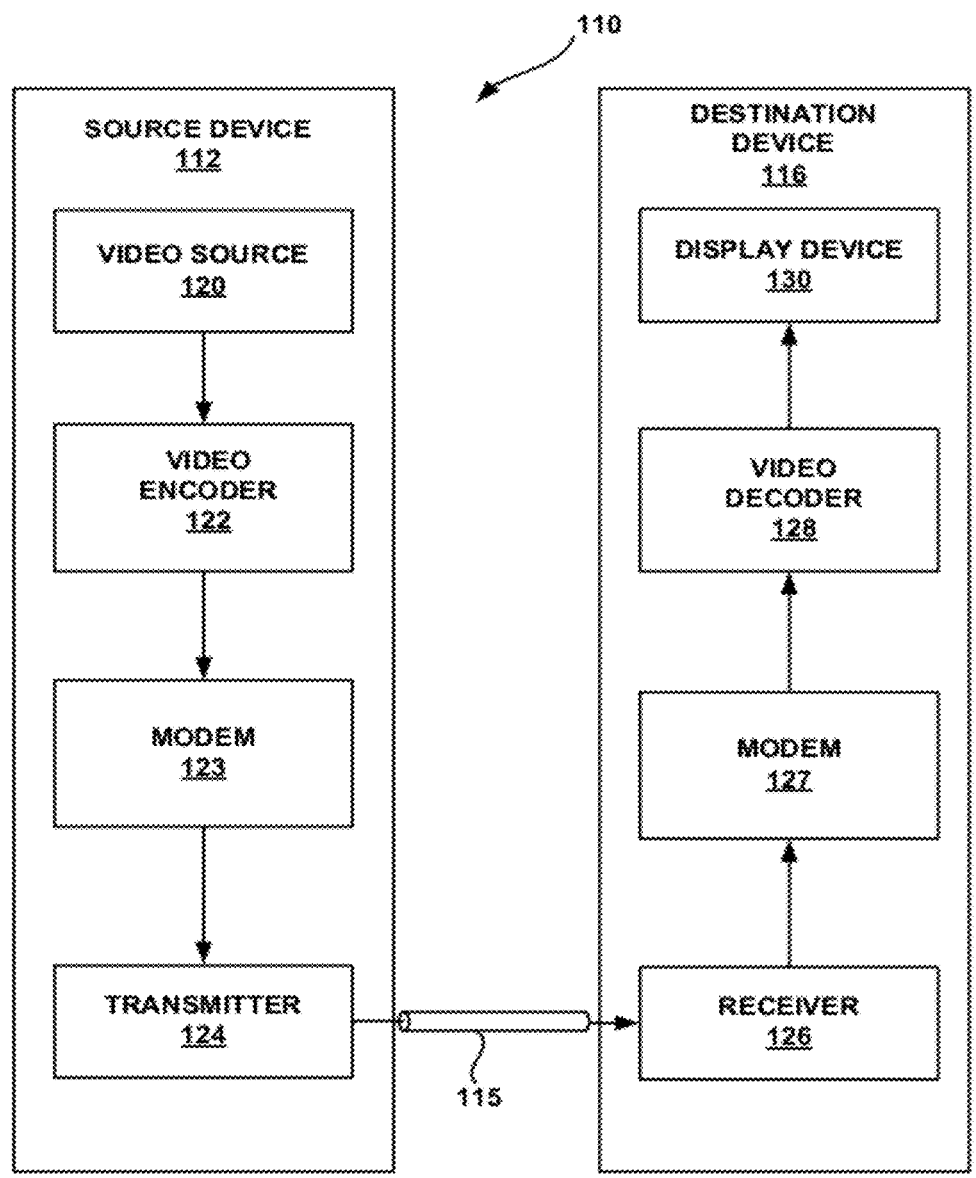
FIG. 1 is a block diagram illustrating an exemplary video encoding and decoding system.

This disclosure describes techniques associated with filtering of video data in a video encoding and/or video decoding process. In accordance with this disclosure, filtering is applied at an encoder, and filter information is encoded in the bitstream to enable a decoder to identify the filtering that was applied at the encoder. The decoder receives encoded video data that includes the filter information, decodes the video data, and applies filtering based on the filtering information. In this way, the decoder applies the same filtering that was applied at the encoder.

According to the techniques of this disclosure, video data can be coded in units referred to as coded units (CUs). Coded units can be partitioned into smaller coded units, or sub-units, using a quadtree partitioning scheme. Syntax identifying the quadtree partitioning scheme for a particular coded unit can be transmitted from an encoder to a decoder. Multiple inputs associated with each sub-unit of a given CU can be filtered during the process of decoding and reconstructing the encoded video data. According to the techniques of this disclosure, filter description syntax can describe a set of filters, such as how many filters are in the set or what shape the filters take. Additional syntax in the bitstream received by the decoder can identify the filters (i.e. the filter coefficients) used at the encoder for a particular sub-unit. The filter used for a particular input can be selected based on activity-metric filter indexing, where certain values for an activity metric are indexed to specific filters within a set of filters. In cases where the activity metric is determined using a sum-modified Laplacian value, the activity-metric filter indexing is sometimes referred to sum-modified Laplacian indexing or just Laplacian indexing. A sum-modified Laplacian value is one commonly used type of activity metric. It is contemplated, however, that the techniques of this invention may be used in conjunction with other types of activity metrics. Additionally, it is contemplated that the techniques of this disclosure may also be implemented with filtering schemes where filters are selected based on more than one activity metric.

Different types of filtering may be applied based on an activity metric determined for the video data. The activity metric may quantify activity associated with one or more blocks of pixels within the video data. The activity metric may comprise a variance metric indicative of pixel variance within a set of pixels. For example, the activity metric may include a sum-modified Laplacian function value, as explained in greater detail below. According to the techniques of this disclosure, a filter unit, such as an adaptive-in loop filter, can be configured to utilize multiple filters based on sum-modified Laplacian filter indexing. The multiple filters may be used in conjunction with a single input or multiple inputs. As will be described in more detail below, the multiple inputs described in this disclosure generally refer to intermediate video block data or image data that is produced during the encoding and decoding processes. Multiple inputs associated with a given video block can include, for example, a reconstructed block or image (RI), a pre-deblocked reconstructed block or image (pRI), a prediction block or image (PI), and/or a quantized prediction error image (EI). In a single input scheme, a filter may only be applied to one of the inputs above, such as RI. Also, as explained in greater detail below, the filtering techniques of this disclosure can be applied to coded units of various sizes using a quadtree partitioning scheme. By utilizing multiple filters with Laplacian filter indexing for coded units partitioned using a quadtree partitioning scheme, video coding performance, as measured by one or both of compression rate and reconstructed video quality, might be improved.

A multi-filter approach, as contemplated in this disclosure, can result in a large number of filters, and hence a large number of filter coefficients needing to be transmitted from an encoder to a decoder. Additionally, a large number of filters can increase the amount of memory needed at a decoder to store the filters and can also increase the computational overhead that occurs when applying filters. To potentially reduce the number of filter coefficients that need to be transmitted from encoder to decoder as well as to potentially improve decoder performance, aspects of this disclosure include the use of filter description syntax to describe a filter or set of filters. The filter description syntax may, for example, identify a number of filters in a set of filters, a maximum number of filters in a set of filters, or either additionally or alternatively, may identify a shape of filters in a set of filters.

By using filter description syntax to convey from encoder to decoder a number of filters and/or a maximum number of filters to be included in a set of filters, overall coding performance may be improved by including a large number of filters when a large number of filters improves either compression rate or reconstructed video quality, but only including a small number of filters, and thus reducing the number of transferred bits, when a large number of filters is not beneficial. A syntax element indicating a maximum number of filters may be included in syntax for a higher level coded unit, such as a frame or slice, while a syntax element indicating a number of filters may be included in syntax for lower level coded units, such as LCUs, of the higher level coded unit. As will be explained in more detail below, the number of bits needed to signal a mapping of a set of filters to ranges of an activity metric can be dependent on a maximum number of filters allowed, and not just on the number of filters used in a set of filters for any given series of video blocks. Therefore, signaling to a decoder a maximum number of filters, for a slice or header for example, may enable the mapping of filters to ranges of an activity metric to be signaled from an encoder to a decoder using fewer bits compared to the number of bits needed for a slice or header that has a greater number of maximum filters. Fewer filters and a smaller activity-metric filter index also can improve decoder performance by reducing the amount of necessary memory and improving the speed in which data is accessed from memory.

Other types of filter description syntax may also be used. For example, filter description syntax describing a shape of a filter may be transmitted from encoder to decoder. As will be described in more detail below, the shape of a filter generally refers to the number of rows and number of columns in a rectangular filter, but the techniques of this disclosure may also be used other filter supports or configurations, including non-rectangular shaped filters. By using filter description syntax to convey from the encoder to the decoder a shape of filters to be used in a set of filters, filters of different shapes can be used when the different shapes improve either the compression or the video quality. For example, in some instances, a set of filters may include 9×9 filters, but in instances where 9×9 filters do not appreciably improve coding performance, 9×5 filters might be used instead. By using 9×5 filters, fewer bits may be needed to transmit filter coefficients from encoder to decoder. Additionally, using different shaped filters, as enabled by the use of filter description syntax that identifies a shape of filters in a set of filters, can also improve decoder performance. In particular, pixel values are typically read from memory row-by-row, thus using filters with a reduced number of rows can reduce the number of memory reads required to perform a particular filtering operation.

Although the techniques of this disclosure will generally be described in reference to in-loop filtering, the techniques may be applied to in-loop filtering, post-loop filtering, and other filtering schemes such as switched filtering. In-loop filtering refers to filtering in which the filtered data is part of the encoding and decoding loops such that filtered data is used for predictive intra- or inter-coding. Post-loop filtering refers to filtering that is applied to reconstructed video data after the encoding loop. With post filtering, the unfiltered data is used for predictive intra- or inter-coding. The techniques of this disclosure are not limited to in-loop filtering or post filtering, and may apply to a wide range of filtering applied during video coding. Additionally, although the techniques of this disclosure are generally described in relation to a multi-input, multi-filter scheme that utilizes Laplacian filter indexing, the techniques may be applied to other filtering schemes such as a single-input, multi-filter filtering scheme.

In this disclosure, the term "coding" refers to encoding or decoding. Similarly, the term "coder" generally refers to any video encoder, video decoder, or combined encoder/decoder (codec). Accordingly, the term "coder" is used herein to refer to a specialized computer device or apparatus that performs video encoding or video decoding.

Additionally, in this disclosure, the term "filter" generally refers to a set of filter coefficients. For example, a 3×3 filter may be defined by a set of 9 filter coefficients, a 5×5 filter may be defined by a set of 25 filter coefficients, a 9×5 filter may be defined by a set of 45 filter coefficients, and so on. The term "set of filters" generally refers to a group of more than one filter. For example, a set of two 3×3 filters, could include a first set of 9 filter coefficients and a second set of 9 filter coefficients. According to techniques described in this disclosure, for a series of video blocks, such as a frame, slice, or largest coding unit (LCU), information identifying sets of filters are transmitted from the encoder to the decoder in a header for the series of the video blocks. The term "shape," sometimes called the "filter support," generally refers to the number of rows of filter coefficients and number of columns of filter coefficients for a particular filter. For example, 9×9 is an example of a first shape, 9×5 is an example of a second shape, and 5×9 is an example of a third shape. In some instances, filters may take non-rectangular shapes including diamond-shapes, diamond-like shapes, circular shapes, circular-like shapes, hexagonal shapes, octagonal shapes, cross shapes, X-shapes, T-shapes, other geometric shapes, or numerous other shapes or configuration.

FIG. 1 is a block diagram illustrating an exemplary video encoding and decoding system 110 that may implement techniques of this disclosure. As shown in FIG. 1, system 110 includes a source device 112 that transmits encoded video data to a destination device 116 via a communication channel 115. Source device 112 and destination device 116 may comprise any of a wide range of devices. In some cases, source device 112 and destination device 116 may comprise wireless communication device handsets, such as so-called cellular or satellite radiotelephones. The techniques of this disclosure, however, which apply more generally to filtering of video data, are not necessarily limited to wireless applications or settings, and may be applied to non-wireless devices including video encoding and/or decoding capabilities.

In the example of FIG. 1, source device 112 includes a video source 120, a video encoder 122, a modulator/demodulator (modem) 123 and a transmitter 124. Destination device 116 includes a receiver 126, a modem 127, a video decoder 128, and a display device 130. In accordance with this disclosure, video encoder 122 of source device 112 may be configured to select one or more sets of filter coefficients for multiple inputs in a video block filtering process and then encode the selected one or more sets of filter coefficients. Specific filters from the one or more sets of filter coefficients may be selected based on an activity metric for one more inputs, and the filter coefficients may be used to filter the one or more inputs. The filtering techniques of this disclosure are generally compatible with any techniques for coding or signaling filter coefficients from an encoder to a decoder.

According to the techniques of this disclosure, a device including video encoder 122 can transmit to a device including video decoder 128 one or more sets of filter coefficients for a frame or slice. For the frame or slice, video encoder 122 may, for example, transmit one set of filters to be used with all inputs, or may transmit multiple sets of filters to be used with multiple inputs (one set per input, for example). Each video block or coded unit within that frame or slice can then contain additional syntax to identify which filter or filters of the set of the filters is to be used for each input of that video block, or which filter or filters of the set of the filters is to be used can be determined based on an activity metric associated with one or more of the inputs.

More specifically, video encoder 122 of source device 112 may select one or more sets of filters for a frame or slice, apply filters from the set(s) to inputs associated with coded units of the slice or frame during the encoding process, and then encode the sets of filters (i.e. sets of filter coefficients) for communication to video decoder 128 of destination device 116. Video encoder 122 may determine an activity metric associated with inputs of coded units coded in order to select which filter(s) from the set(s) of filters to use with that particular coded unit. On the decoder side, video decoder 128 of destination device 116 may also determine the activity metric for one or more inputs associated with the coded unit so that video decoder 128 can determine which filter(s) from the set(s) of filters to apply to the pixel data, or in some instances, video decoder 128 may determine the filter coefficients directly from filter information received in the bitstream syntax. Video decoder 128 may decode the filter coefficients based on direct decoding or predictive decoding depending upon how the filter coefficients were encoded, which may be signaled as part of the bitstream syntax. Additionally, the bitstream may include filter description syntax to describe the filters for a set of filters. Based on the filter description syntax, decoder 128 can reconstruct the filter coefficients based on additional information received from encoder 122. The illustrated system 110 of FIG. 1 is merely exemplary. The filtering techniques of this disclosure may be performed by any encoding or decoding devices. Source device 112 and destination device 116 are merely examples of coding devices that can support such techniques.

Video encoder 122 of source device 112 may encode video data received from video source 120 using the techniques of this disclosure. Video source 120 may comprise a video capture device, such as a video camera, a video archive containing previously captured video, or a video feed from a video content provider. As a further alternative, video source 120 may generate computer graphics-based data as the source video, or a combination of live video, archived video, and computer-generated video. In some cases, if video source 120 is a video camera, source device 112 and destination device 116 may form so-called camera phones or video phones. In each case, the captured, pre-captured or computer-generated video may be encoded by video encoder 122.

Once the video data is encoded by video encoder 122, the encoded video information may then be modulated by modem 123 according to a communication standard, e.g., such as code division multiple access (CDMA), frequency division multiple access (FDMA), orthogonal frequency division multiplexing (OFDM), or any other communication standard or technique, and transmitted to destination device 116 via transmitter 124. Modem 123 may include various mixers, filters, amplifiers or other components designed for signal modulation. Transmitter 124 may include circuits designed for transmitting data, including amplifiers, filters, and one or more antennas.

Receiver 126 of destination device 116 receives information over channel 115, and modem 127 demodulates the information. The video decoding process performed by video decoder 128 may include filtering, e.g., as part of the in-loop decoding or as a post filtering step following the decoding loop. Either way, the set of filters applied by video decoder 128 for a particular slice or frame may be decoded using the techniques of this disclosure. Decoded filter information may include identifying filter description syntax in the coded bit stream. If, for example, predictive coding is used for the filter coefficients, similarities between different filter coefficients may be exploited to reduce the amount of information conveyed over channel 115. In particular, a filter (i.e. a set of the filter coefficients) can be predictively coded as difference values relative to another set of the filter coefficients associated with a different filter. The different filter may, for example, be associated with a different slice or frame. In such a case, video decoder 128 might receive an encoded bitstream comprising video blocks and filter information that identifies the different frame or slice with which the different filter is associated filter. The filter information also includes difference values that define the current filter relative to the filter of the different coded unit. In particular, the difference values may comprise filter coefficient difference values that define filter coefficients for the current filter relative to filter coefficients of a different filter used for a different coded unit.

Video decoder 128 decodes the video blocks, generates the filter coefficients, and filters the decoded video blocks based on the generated filter coefficients. Video decoder 128 can generate the filter coefficients based on filter description syntax retrieved from the bit stream. The decoded and filtered video blocks can be assembled into video frames to form decoded video data. Display device 130 displays the decoded video data to a user, and may comprise any of a variety of display devices such as a cathode ray tube (CRT), a liquid crystal display (LCD), a plasma display, an organic light emitting diode (OLED) display, or another type of display device.

Communication channel 115 may comprise any wireless or wired communication medium, such as a radio frequency (RF) spectrum or one or more physical transmission lines, or any combination of wireless and wired media. Communication channel 115 may form part of a packet-based network, such as a local area network, a wide-area network, or a global network such as the Internet. Communication channel 115 generally represents any suitable communication medium, or collection of different communication media, for transmitting video data from source device 112 to destination device 116.

Video encoder 122 and video decoder 128 may operate according to a video compression standard such as the ITU-T H.264 standard, alternatively referred to as MPEG-4, Part 10, Advanced Video Coding (AVC), which will be used in parts of this disclosure for purposes of explanation. However, many of the techniques of this disclosure may be readily applied to any of a variety of other video coding standards, including the newly emerging HEVC standard. Generally, any standard that allows for filtering at the encoder and decoder may benefit from various aspects of the teaching of this disclosure.

Although not shown in FIG. 1, in some aspects, video encoder 122 and video decoder 128 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 122 and video decoder 128 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 122 and video decoder 128 may be included in one or more encoders or decoders, either of which may be integrated as part of a combined encoder/decoder (CODEC) in a respective mobile device, subscriber device, broadcast device, server, or the like.

In some cases, devices 112, 116 may operate in a substantially symmetrical manner. For example, each of devices 112, 116 may include video encoding and decoding components. Hence, system 110 may support one-way or two-way video transmission between video devices 112, 116, e.g., for video streaming, video playback, video broadcasting, or video telephony.

During the encoding process, video encoder 122 may execute a number of coding techniques or steps. In general, video encoder 122 operates on video blocks within individual video frames in order to encode the video data. In one example, a video block may correspond to a macroblock or a partition of a macroblock. Macroblocks are one type of video block defined by the ITU H.264 standard and other standards. Macroblocks typically refer to 16×16 blocks of data, although the term is also sometimes used generically to refer to any video block of N×N size. The ITU-T H.264 standard supports intra prediction in various block sizes, such as 16×16, 8×8, or 4×4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" refers to the pixel dimensions of the block in terms of vertical and horizontal dimensions, e.g., 16×16 pixels. In general, a 16×16 block will have 16 pixels in a vertical direction and 16 pixels in a horizontal direction. Likewise, an N×N block generally has N pixels in a vertical direction and N pixels in a horizontal direction, where N represents a positive integer value. The pixels in a block may be arranged in rows and columns.

The emerging HEVC standard defines new terms for video blocks. In particular, video blocks (or partitions thereof) may be referred to as "coded units" (or CUs). With the HEVC standard, largest coded units (LCUs) may be divided into smaller and CUs according to a quadtree partitioning scheme, and the different CUs that are defined in the scheme may be further partitioned into so-called prediction units (PUs). The LCUs, CUs, and PUs are all video blocks within the meaning of this disclosure. Other types of video blocks may also be used, consistent with the HEVC standard or other video coding standards. Thus, the phrase "video blocks" refers to any size of video block. Separate CUs may be included for luma components and scaled sizes for chroma components for a given pixel, although other color spaces could also be used.

Video blocks may have fixed or varying sizes, and may differ in size according to a specified coding standard. Each video frame may include a plurality of slices. Each slice may include a plurality of video blocks, which may be arranged into partitions, also referred to as sub-blocks. In accordance with the quadtree partitioning scheme referenced above and described in more detail below, an N/2×N/2 first CU may comprise a sub-block of an N×N LCU, an N/4×N/4 second CU may also comprise a sub-block of the first CU. An N/8×N/8 PU may comprise a sub-block of the second CU. Similarly, as a further example, block sizes that are less than 16×16 may be referred to as partitions of a 16×16 video block or as sub-blocks of the 16×16 video block. Likewise, for an N×N block, block sizes less than N×N may be referred to as partitions or sub-blocks of the N×N block. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Syntax data within a bitstream may define an LCU for a frame or a slice, which is a largest coding unit in terms of the number of pixels for that frame or slice. In general, an LCU or CU has a similar purpose to a macroblock coded according to H.264, except that LCUs and CUs do not have a specific size distinction. Instead, an LCU size can be defined on a frame-by-frame or slice-by-slice basis, and an LCU be split into CUs. In general, references in this disclosure to a CU may refer to a largest coded unit of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU). This disclosure also uses the terms "block" and "video block" to refer to any of an LCU, CU, PU, SCU, or TU.

As introduced above, an LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more transform units (TUs). The TUs comprise the data structure that includes residual transform coefficients, which are typically quantized. In particular, following prediction using a PU, a video encoder may calculate residual values for the portion of the CU corresponding to the PU. The residual values may be transformed, quantized, scanned and stored in a TU, which may have variable sizes corresponding the size of the transform that was performed. Accordingly, a TU is not necessarily limited to the size of a PU. Thus, TUs may be larger or smaller than corresponding PUs for the same CU. In some examples, the maximum size of a TU may be the size of the corresponding CU. Again, the TUs may comprise the data structures that include the residual transform coefficients associated with a given CU.

Figure 2A:
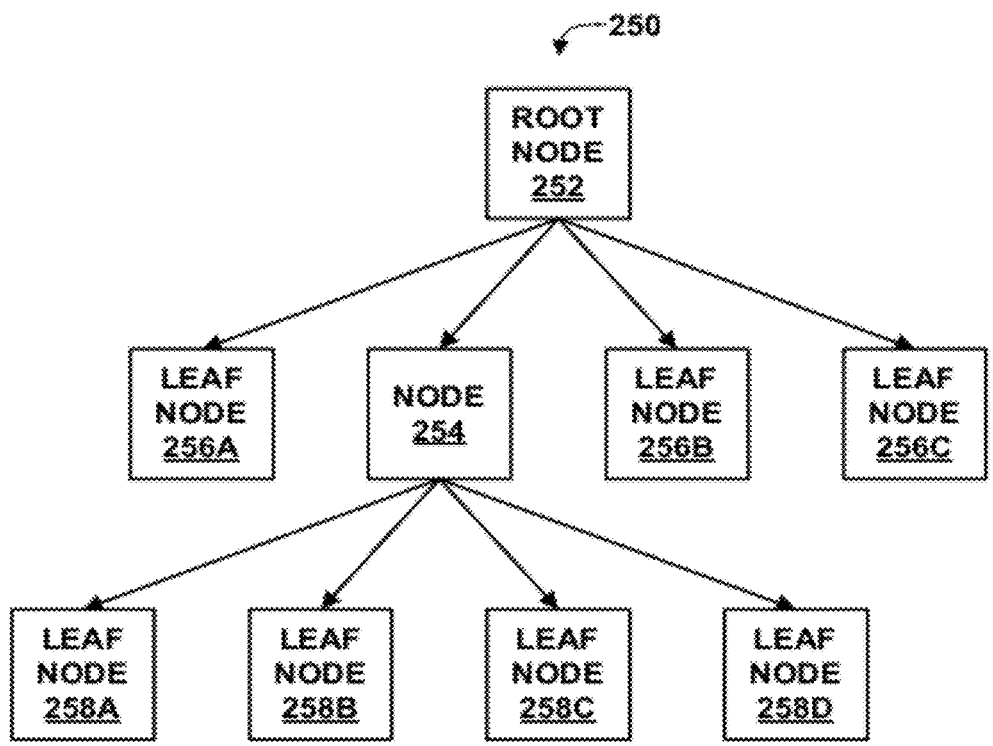
FIGS. 2A and 2B are conceptual diagrams illustrating an example of quadtree partitioning applied to a largest coding unit (LCU).
Figure 2B:
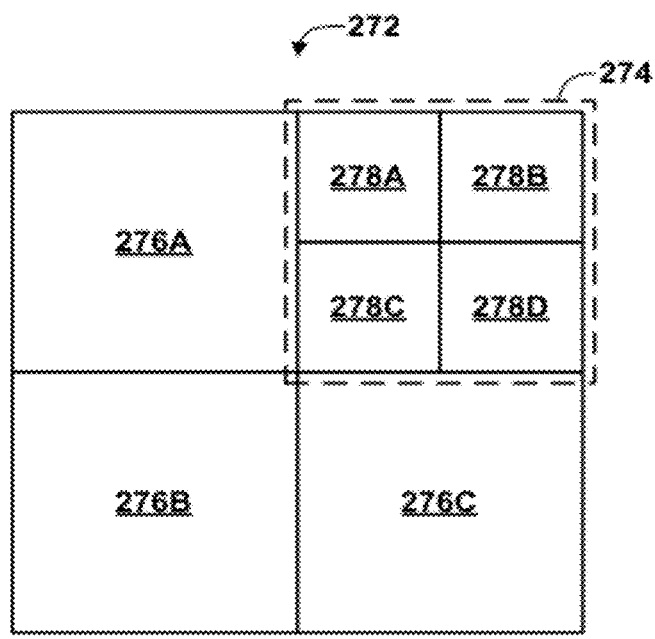

FIGS. 2A and 2B are conceptual diagrams illustrating an example quadtree 250 and a corresponding largest coding unit 272. FIG. 2A depicts an example quadtree 250, which includes nodes arranged in a hierarchical fashion. Each node in a quadtree, such as quadtree 250, may be a leaf node with no children, or have four child nodes. In the example of FIG. 2A, quadtree 250 includes root node 252. Root node 252 has four child nodes, including leaf nodes 256A-256C (leaf nodes 256) and node 254. Because node 254 is not a leaf node, node 254 includes four child nodes, which in this example, are leaf nodes 258A-258D (leaf nodes 258).

Quadtree 250 may include data describing characteristics of a corresponding largest coding unit (LCU), such as LCU 272 in this example. For example, quadtree 250, by its structure, may describe splitting of the LCU into sub-CUs. Assume that LCU 272 has a size of 2N×2N. LCU 272, in this example, has four sub-CUs 276A-276C (sub-CUs 276) and 274, each of size N×N. Sub-CU 274 is further split into four sub-CUs 278A-278D (sub-CUs 278), each of size N/2×N/2. The structure of quadtree 250 corresponds to the splitting of LCU 272, in this example. That is, root node 252 corresponds to LCU 272, leaf nodes 256 correspond to sub-CUs 276, node 254 corresponds to sub-CU 274, and leaf nodes 258 correspond to sub-CUs 278.

Data for nodes of quadtree 250 may describe whether the CU corresponding to the node is split. If the CU is split, four additional nodes may be present in quadtree 250. In some examples, a node of a quadtree may be implemented similar to the following pseudocode:

```
quadtree_node {
    boolean split_flag(1);
    // signaling data
```

```
        if (split_flag) {
            quadtree_node child1;
            quadtree_node child2;
            quadtree_node child3;
            quadtree_node child4;
        }
    }
```

The split_flag value may be a one-bit value representative of whether the CU corresponding to the current node is split. If the CU is not split, the split_flag value may be '0', while if the CU is split, the split_flag value may be '1'. With respect to the example of quadtree 250, an array of split flag values may be 101000000.

In some examples, each of sub-CUs 276 and sub-CUs 278 may be intra-prediction encoded using the same intra-prediction mode. Accordingly, video encoder 122 may provide an indication of the intra-prediction mode in root node 252. Moreover, certain sizes of sub-CUs may have multiple possible transforms for a particular intra-prediction mode. In accordance with the techniques of this disclosure, video encoder 122 may provide an indication of the transform to use for such sub-CUs in root node 252. For example, sub-CUs of size N/2×N/2 may have multiple possible transforms available. Video encoder 122 may signal the transform to use in root node 252. Accordingly, video decoder 128 may determine the transform to apply to sub-CUs 278 based on the intra-prediction mode signaled in root node 252 and the transform signaled in root node 252.

As such, video encoder 122 need not signal transforms to apply to sub-CUs 276 and sub-CUs 278 in leaf nodes 256 and leaf nodes 258, but may instead simply signal an intra-prediction mode and, in some examples, a transform to apply to certain sizes of sub-CUs, in root node 252, in accordance with the techniques of this disclosure. In this manner, these techniques may reduce the overhead cost of signaling transform functions for each sub-CU of an LCU, such as LCU 272.

In some examples, intra-prediction modes for sub-CUs 276 and/or sub-CUs 278 may be different than intra-prediction modes for LCU 272. Video encoder 122 and video decoder 128 may be configured with functions that map an intra-prediction mode signaled at root node 252 to an available intra-prediction mode for sub-CUs 276 and/or sub-CUs 278. The function may provide a many-to-one mapping of intra-prediction modes available for LCU 272 to intra-prediction modes for sub-CUs 276 and/or sub-CUs 278.

Figure 2D:
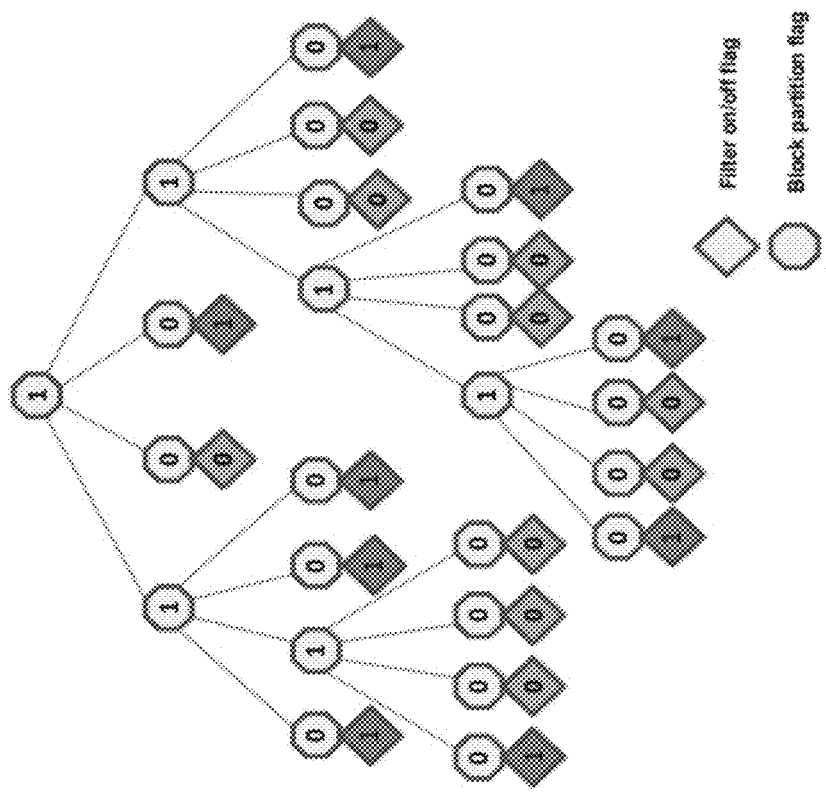
FIGS. 2C and 2D are conceptual diagrams illustrating example filter decisions for coded units of the LCU shown in FIGS. 2A and 2B.
Figure 2C:
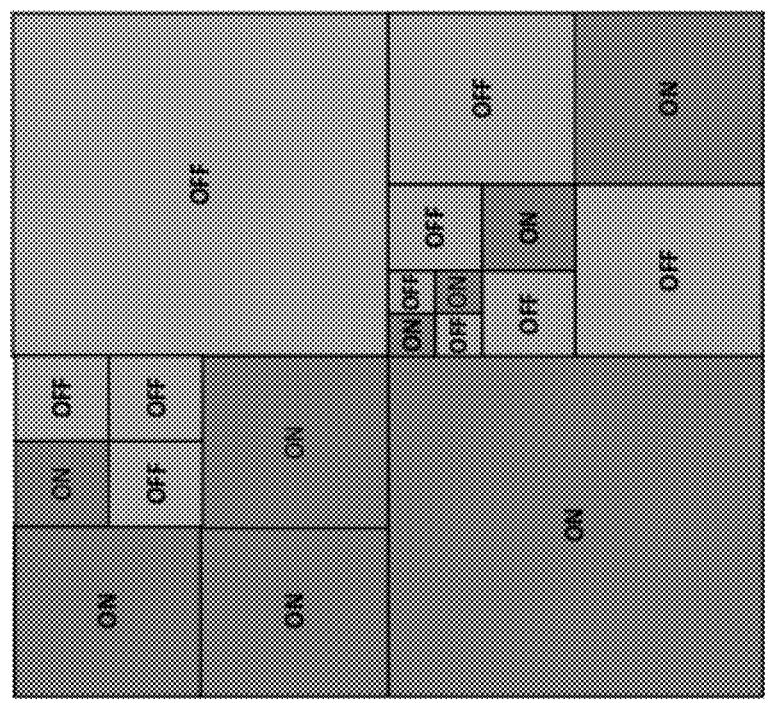

A slice may be divided into video blocks (or LCUs) and each video block may be partitioned according to the quadtree structure described in relation to FIGS. 2A-B. Additionally, as shown in FIG. 2C, the quadtree sub-blocks indicated by "ON" may be filtered by loop filters described herein, while quadtree sub-blocks indicated by "OFF" may not be filtered. The decision of whether or not to filter a given block or sub-block may be determined at the encoder by comparing the filtered result and the non-filtered result relative to the original block being coded. FIG. 2D is a decision tree representing partitioning decisions that results in the quadtree partitioning shown in FIG. 2C.

In particular, FIG. 2C may represent a relatively large video block that is partitioned according to a quadtree portioning scheme into smaller video blocks of varying sizes. Each video block is labelled (on or off) in FIG. 2C, to illustrate whether filtering should be applied or avoided for that video block. The video encoder may define this filter map by comparing filtered and unfiltered versions of each video block to the original video block being coded.

Again, FIG. 2D is a decision tree corresponding to partitioning decisions that result in the quadtree partitioning shown in FIG. 2C. In FIG. 2D, each circle may correspond to a CU. If the circle includes a "1" flag, then that CU is further partitioned into four more CUs, but if the circle includes a "0" flag, then that CU is not partitioned any further. Each circle (e.g., corresponding to CUs) also includes an associated triangle. If the flag in the triangle for a given CU is set to 1, then filtering is turned "ON" for that CU, but if the flag in the triangle for a given CU is set to 0, then filtering is turned off. In this manner, FIGS. 2C and 2D may be individually or collectively viewed as a filter map that can be generated at an encoder and communicated to a decoder at least once per slice of encoded video data in order to communicate the level of quadtree partitioning for a given video block (e.g., an LCU) whether or not to apply filtering to each partitioned video block (e.g., each CU within the LCU).

Smaller video blocks can provide better resolution, and may be used for locations of a video frame that include high levels of detail. Larger video blocks can provide greater coding efficiency, and may be used for locations of a video frame that include a low level of detail. A slice may be considered to be a plurality of video blocks and/or sub-blocks. Each slice may be an independently decodable series of video blocks of a video frame. Alternatively, frames themselves may be decodable series of video blocks, or other portions of a frame may be defined as decodable series of video blocks. The term "series of video blocks" may refer to any independently decodable portion of a video frame such as an entire frame, a slice of a frame, a group of pictures (GOP) also referred to as a sequence, or another independently decodable unit defined according to applicable coding techniques. Aspects of this disclosure might be described in reference to frames or slices, but such references are merely exemplary. It should be understood that generally any series of video blocks may be used instead of a frame or a slice.

Syntax data may be defined on a per-coded-unit basis such that each coded unit includes associated syntax data. The filter information described herein, including the filter description syntax, may be part of such syntax for a coded unit, but might more likely be part of syntax for a series of video blocks, such as a frame, a slice, a GOP, LCU, or a sequence of video frames, instead of for a coded unit. The syntax data can indicate the set or sets of filters to be used with coded units of the slice or frame. Additionally, not all filter information necessarily has to be included in the header of a common series of video blocks. For example, filter description syntax might be transmitted in a frame header, while other filter information is transmitted in a header for an LCU.

Video encoder 122 may perform predictive coding in which a video block being coded is compared to a predictive frame (or other coded unit) in order to identify a predictive block. The differences between the current video block being coded and the predictive block are coded as a residual block, and prediction syntax is used to identify the predictive block. The residual block may be transformed and quantized. Transform techniques may comprise a DCT process or conceptually similar process, integer transforms, wavelet transforms, or other types of transforms. In a DCT process, as an example, the transform process converts a set of pixel values into transform coefficients, which may represent the energy of the pixel values in the frequency domain. Quantization is typically applied to the transform coefficients, and generally involves a process that limits the number of bits associated with any given transform coefficient.

Following transform and quantization, entropy coding may be performed on the quantized and transformed residual video blocks. Syntax elements, such as the filter information and prediction vectors defined during the encoding, may also be included in the entropy coded bitstream for each coded unit. In general, entropy coding comprises one or more processes that collectively compress a sequence of quantized transform coefficients and/or other syntax information. Scanning techniques, such as zig-zag scanning techniques, are performed on the quantized transform coefficients, e.g., as part of the entropy coding process, in order to define one or more serialized one-dimensional vectors of coefficients from two-dimensional video blocks. Other scanning techniques, including other scan orders or adaptive scans, may also be used, and possibly signaled in the encoded bitstream. In any case, the scanned coefficients are then entropy coded along with any syntax information, e.g., via content adaptive variable length coding (CAVLC), context adaptive binary arithmetic coding (CABAC), or another entropy coding process.

As part of the encoding process, encoded video blocks may be decoded in order to generate the video data used for subsequent prediction-based coding of subsequent video blocks. At this stage, filtering may be performed in order to improve video quality, and e.g., remove blockiness artifacts from decoded video. The filtered data may be used for prediction of other video blocks, in which case the filtering is referred to as "in-loop" filtering. Alternatively, prediction of other video blocks may be based on unfiltered data, in which case the filtering is referred to as "post filtering."

On a frame-by-frame, slice-by-slice, or LCU-by-LCU basis, the encoder may select one or more sets of filters, and on a coded-unit-by-coded-unit basis may select one or more filters from the set(s). Both selections can be made in a manner that promotes the video quality. Such sets of filters may be selected from pre-defined sets of filters, or may be adaptively defined to promote video quality. As an example, video encoder 122 may select or define several sets of filters for a given frame or slice such that different filters are used for different pixels or groups of pixels of coded units of that frame or slice. In particular, for each input associated with a coded unit, several sets of filter coefficients may be defined, and the activity metric associated with the pixels of the coded unit may be used to determine which filter from the set of filters to use with such pixels. In some instances, filters may be selected and applied for pixels on a pixel-by-pixel basis. However, in other instances, filters may be selected and applied to pixels on a group-by-group basis, where each group might be, for example, a 2×2 block or 4×4 block of pixels.

In some cases, video encoder 122 may apply several sets of filter coefficients and select one or more sets that produce the best quality video in terms of amount of distortion between a coded block and an original block, and/or the highest levels of compression. In any case, once selected, the set of filter coefficients applied by video encoder 122 for each coded unit may be encoded and communicated to video decoder 128 of destination device 116 so that video decoder 128 can apply the same filtering that was applied during the encoding process for each given coded unit.

As discussed in this disclosure, filter description syntax can be can be used to reduce the number of bits needed to reconstruct filters. When an activity metric is used for determining which filter to use with a particular input for a coded unit, the selection of the filter for that particular coded unit does not necessarily need to be communicated to video decoder 128. Instead, video decoder 128 can also calculate the activity metric for the coded unit, and based on filter information previously provided by video encoder 122, match the activity metric to a particular filter.

Figure 3:
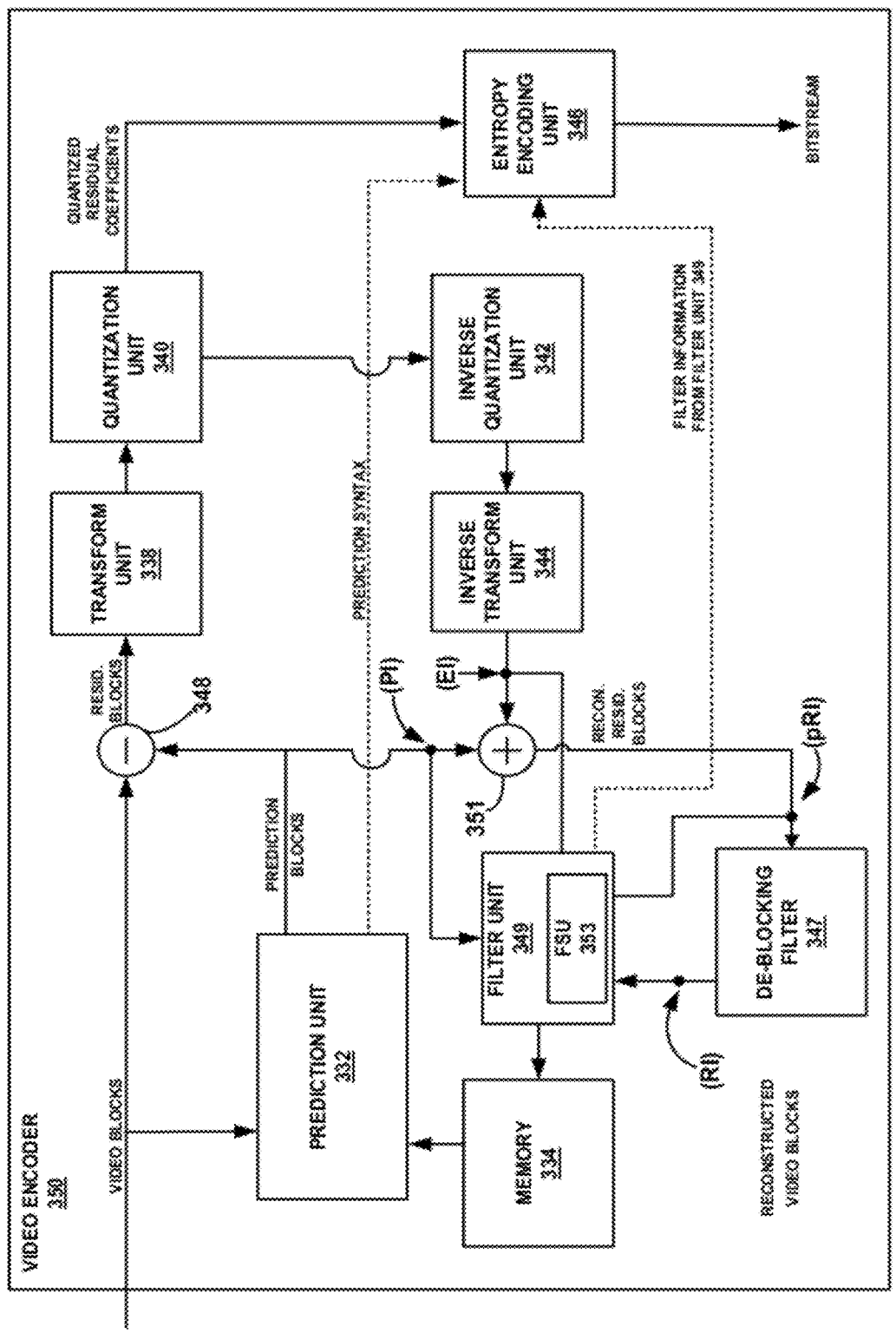
FIG. 3 is a block diagram illustrating an exemplary video encoder consistent with this disclosure.

FIG. 3 is a block diagram illustrating a video encoder 350 consistent with this disclosure. Video encoder 350 may correspond to video encoder 122 of device 120, or a video encoder of a different device. As shown in FIG. 3, video encoder 350 includes a prediction unit 332, adders 348 and 351, and a memory 334. Video encoder 350 also includes a transform unit 338 and a quantization unit 340, as well as an inverse quantization unit 342 and an inverse transform unit 344. Video encoder 350 also includes a deblocking filter 347 and an adaptive filter unit 349. Video encoder 350 also includes an entropy encoding unit 346. Filter unit 349 of video encoder 350 may perform filtering operations and also may include a filter selection unit (FSU) 353 for identifying a desirable or preferred filter or set of filters to be used for decoding. Filter unit 349 may also generate filter information identifying the selected filters so that the selected filters can be efficiently communicated as filter information to another device to be used during a decoding operation.

During the encoding process, video encoder 350 receives a video block, such as an LCU, to be coded, and prediction unit 332 performs predictive coding techniques on the video block. Using the quadtree partitioning scheme discussed above, prediction unit 332 can partition the video block and perform predictive coding techniques on coding units of different sizes. For inter coding, prediction unit 332 compares the video block to be encoded, including sub-blocks of the video block, to various blocks in one or more video reference frames or slices in order to define a predictive block. For intra coding, prediction unit 332 generates a predictive block based on neighboring data within the same coded unit. Prediction unit 332 outputs the prediction block and adder 348 subtracts the prediction block from the video block being coded in order to generate a residual block.

For inter coding, prediction unit 332 may comprise motion estimation and motion compensation units that identify a motion vector that points to a prediction block and generates the prediction block based on the motion vector. Typically, motion estimation is considered the process of generating the motion vector, which estimates motion. For example, the motion vector may indicate the displacement of a predictive block within a predictive frame relative to the current block being coded within the current frame. Motion compensation is typically considered the process of fetching or generating the predictive block based on the motion vector determined by motion estimation. For intra coding, prediction unit 332 generates a predictive block based on neighboring data within the same coded unit. One or more intra-prediction modes may define how an intra prediction block can be defined.

After prediction unit 332 outputs the prediction block and adder 48 subtracts the prediction block from the video block being coded in order to generate a residual block, transform unit 38 applies a transform to the residual block. The transform may comprise a discrete cosine transform (DCT) or a conceptually similar transform such as that defined by a coding standard such as the HEVC standard. Wavelet transforms, integer transforms, sub-band transforms or other types of transforms could also be used. In any case, transform unit 338 applies the transform to the residual block, producing a block of residual transform coefficients. The transform may convert the residual information from a pixel domain to a frequency domain.

Quantization unit 340 then quantizes the residual transform coefficients to further reduce bit rate. Quantization unit 340, for example, may limit the number of bits used to code each of the coefficients. After quantization, entropy encoding unit 346 scans the quantized coefficient block from a two-dimensional representation to one or more serialized one-dimensional vectors. The scan order may be pre-programmed to occur in a defined order (such as zig-zag scanning, horizontal scanning, vertical scanning, combinations, or another pre-defined order), or possibly adaptive defined based on previous coding statistics.

Following this scanning process, entropy encoding unit 346 encodes the quantized transform coefficients (along with any syntax elements) according to an entropy coding methodology, such as CAVLC or CABAC, to further compress the data. Syntax elements included in the entropy coded bitstream may include prediction syntax from prediction unit 332, such as motion vectors for inter coding or prediction modes for intra coding. Syntax elements included in the entropy coded bitstream may also include filter information from filter unit 349, which can be encoded in the manner described herein.

CAVLC is one type of entropy encoding technique supported by the ITU H.264/MPEG4, AVC standard, which may be applied on a vectorized basis by entropy encoding unit 346. CAVLC uses variable length coding (VLC) tables in a manner that effectively compresses serialized "runs" of transform coefficients and/or syntax elements. CABAC is another type of entropy coding technique supported by the ITU H.264/MPEG4, AVC standard, which may be applied on a vectorized basis by entropy encoding unit 346. CABAC involves several stages, including binarization, context model selection, and binary arithmetic coding. In this case, entropy encoding unit 346 codes transform coefficients and syntax elements according to CABAC. Like the ITU H.264/MPEG4, AVC standard, the emerging HEVC standard may also support both CAVLC and CABAC entropy coding. Furthermore, many other types of entropy coding techniques also exist, and new entropy coding techniques will likely emerge in the future. This disclosure is not limited to any specific entropy coding technique.

Following the entropy coding by entropy encoding unit 346, the encoded video may be transmitted to another device or archived for later transmission or retrieval. Again, the encoded video may comprise the entropy coded vectors and various syntax, which can be used by the decoder to properly configure the decoding process. Inverse quantization unit 342 and inverse transform unit 344 apply inverse quantization and inverse transform, respectively, to reconstruct the residual block in the pixel domain. Summer 351 adds the reconstructed residual block to the prediction block produced by prediction unit 332 to produce a pre-deblocked reconstructed video block, sometimes referred to as pre-deblocked reconstructed image. De-blocking filter 347 may apply filtering to the pre-deblocked reconstructed video block to improve video quality by removing blockiness or other artifacts. The output of the de-blocking filter 347 can be referred to as a post-deblocked video block, reconstructed video block, or reconstructed image.

Filter unit 349 can be configured to receive multiple inputs. In the example of FIG. 3, filter unit 349 receives as input the post-deblocked reconstructed image (RI), pre-deblocked reconstructed image (pRI), the prediction image (PI), and the reconstructed residual block (EI). Filter unit 349 can use any of these inputs either individually or in combination to produce a reconstructed image to store in memory 334. Additionally, as will be discussed in more detail below, based on an activity metric, one or more filters can be selected to be applied to the input(s). In one example, the output of filter unit 349 may be one additional filter applied to RI. In another example, the output of filter unit 349 may be one additional filter applied to pRI. In other examples, however, the output of filter unit 349 may be based on multiple inputs. For example, filter unit 349 may apply a first filter to pRI and then use the filtered version of pRI in conjunction with filtered versions of EI and PI to create a reconstructed image. In instances where the output of filter unit 349 is the product of one additional filter being applied to a single input, filter unit 349 may in fact apply filters to the other inputs, but those filters might have all zero coefficients. Similarly, if the output of filter unit 349 is the product of applying three filters to three inputs, filter unit 349 may in fact apply a filter to the fourth input, but that filter might have all zero coefficients.

Filter unit 349 may also be configured to receive a single input. For example, although FIG. 3 shows PI, EI, pRI, and RI being input into filter unit 349, in some implementations RI might be the only input received by filter unit 349. In such an implementation, filter unit 349 might apply a filter to RI so that a filtered version of RI is more similar to the original image than the unfiltered version of RI. In other implementations, filter unit 349 and de-blocking filter 347 may be combined into a single filtering unit that applies filtering to pRI. The techniques of this disclosure, including the use of filter description syntax, are compatible with both single-input and multi-input filtering schemes that utilize multiple filters.

Filtering by filter unit 349 may improve compression by generating predictive video blocks that more closely match video blocks being coded than unfiltered predictive video blocks. After filtering, the reconstructed video block may be used by prediction unit 332 as a reference block to inter-code a block in a subsequent video frame or other coded unit. Although filter unit 349 is shown "in-loop," the techniques of this disclosure could also be used with post filters, in which case non-filtered data (rather than filtered data) would be used for purposes of predicting data in subsequent coded units.

For a slice or frame, filter unit 349 may select sets of filters for each input in a manner that promotes the video quality. For example, filter unit 349 may select sets of filters from pre-defined sets of coefficients, or may adaptively define filters in order to promote video quality or improved compression. Filter unit 349 may select or define one or more sets of filters for a given coded unit such that the same set(s) of filters are used for pixels of different video blocks of that coded unit. For a particular frame, slice, or LCU, filter unit 349 may apply several sets of filters to multiple inputs, and FSU 353 may select the set that produces the best quality video or the highest levels of compression. Alternatively, FSU 353 may train a new filter by analyzing the auto-correlations and cross-correlations between multiple inputs and an original image. A new set of filters may, for example, be determined by solving Wienter-Hopt equations based on the auto- and cross-correlations. Regardless of whether a new set of filters is trained or an existing set of filters are selected, filter unit 349 generates syntax for inclusion in the bit stream that enables a decoder to also identify the set or sets of filters to be used for the particular frame or slice.

According to this disclosure, for each pixel of a coded unit within the frame or slice, filter unit 349 may select which filter from the set of filters is to be used based on an activity metric that quantifies activity associated with one or more sets of pixels within the coded unit. In this way, FSU 353 may determine sets of filters for a higher level coded unit such as a frame or slice, while filter unit 349 determines which filter(s) from the set(s) is to be used for a particular pixel of a lower level coded unit based on the activity associated with the pixels of that lower level coded unit. Activity may be indicated in terms of pixel value variance within a coded unit. More variance in the pixel values in the coded unit may indicate higher levels of pixel activity, while less variance in the pixel values may indicate lower levels of pixel activity. Different filters (i.e. different filter coefficients) may result in better filtering (e.g., higher image quality) depending on the level of pixel variance, i.e., activity. The pixel variance may be quantified by an activity metric, which may comprise a sum-modified Laplacian value as discussed in greater detail below. However, other types of activity metrics may also be used.

Instead of a single filter for each input, a set of M filters may be used for each input. Depending on design preferences, M may for example be as few as 2 or as great as 16, or even higher. A large number of filters per input may improve video quality, but also may increase overhead associated with signaling sets of filters from encoder to decoder. The set of M filters can be determined by FSU 353 as described above and transmitted to the decoder for each frame or slice. A segmentation map can be used to indicate how a coded unit is segmented and whether or not a particular sub-unit of the coded unit is to be filtered. The segmentation map, may for example, include for a coded unit an array of split flags as described above as well an additional bit signaling whether each sub-coded unit is to be filtered. For each input associated with a pixel of a coded unit that is to be filtered, a specific filter from the set of filters can be chosen based on the activity metric. The activity metric can be calculated using a sum-modified Laplacian for pixel (i,j) as follows:

$$\text{var}(i, j) = \sum_{k=-K}^{K} \sum_{l=-L}^{L} |2R(i+k, j+l) - R(i+k-1, j+l) - R(i+k+1, j+l)| + |2R(i+k, j+l) - R(i+k, j+l-1) - R(i+k, j+l+1)|.$$

As one example, a 7×7 (K, L=3) group of surrounding pixels may be used for calculation of the sum-modified Laplacian value. The particular filter from the set of M filters to be used for a particular range of sum-modified Laplacian values can also be sent to the decoder with the set of M filters. Filter coefficients can be coded using prediction from coefficients transmitted for previous frames or other techniques. Filters of various shapes and sizes, including for example 1×1, 3×3, 5×5, 7×7, and 9×9 filters with diamond shape support or square shape support might be used.

The indexing of sum-modified Laplacian values for inputs to filters can be implemented in multiple ways. For example, in some implementations each input might have a unique set of filters, while in some implementations inputs share a common set of filters. Additionally, in some implementations, a sum-modified Laplacian value for each input might be used to identify a particular filter for each input. In other implementations, however, a sum-modified Laplacian value for a single input might be used to identify filters for all the inputs. In yet other implementations, a sum-modified Laplacian value for a first input might be used to identify a filter for a second, different input.

In accordance with this disclosure, filter unit 349 performs coding techniques with respect to filter information that may reduce the amount of data needed to encode and convey filter information from encoder 350 to another device. Again, for each frame or slice, filter unit 349 may define or select one or more sets of filter coefficients to be applied to the pixels of coded units for that frame or slice. Filter unit 349 applies the filter coefficients in order to filter video blocks of reconstructed video frames stored in memory 334, which may be used for predictive coding consistent with in-loop filtering. Filter unit 349 can encode the filter coefficients as filter information, which is forwarded to entropy encoding unit 346 for inclusion in the encoded bitstream.

The filter information can include filter description syntax that identifies a maximum number of filters to be included in a set of filters. The filter description syntax may, for example, be included in syntax associated with a higher level coded unit such as a slice or frame, while the number of filters for lower level coded units, such as LCUs, may be signaled in syntax associated with the lower level coded unit. The number of filters in a set of filters for a particular lower level coded unit may be less than the maximum number of filters enabled for that lower level coded unit. For example, if a slice or frame has a maximum of eight filters per set, some LCUs in the slice or frame may have eight filters per set, but other LCUs may only have two or four or any other number between one and eight.

By using filter description syntax to convey from encoder to decoder a maximum number of filters to be included in a set of filters, overall coding performance may be improved because filter unit 349 can use a set of filters with a large number of filters when a large number of filters improves either compression rate or reconstructed video quality, but filter unit 349 may also only use a small number of filters when a large number of filters is either not beneficial or only minimally beneficial. Using a smaller number of filters can reduce the overall number of bits transferred by video encoder 350 by reducing the number of bits needed to reconstruct filter coefficients. Additionally, using filter description syntax to identify a maximum number of filters may reduce the number of bits needed to transmit an activity-metric filter index. The number of ranges for an activity-metric filter index is often a function of a maximum number of filters allowed, not just the number of filters used for any particular series of video blocks. For example, if the maximum number of filters for a particular filter set is sixteen, then the activity-metric filter index for the set might have sixteen ranges. Even when using a smaller filter set, such as four filters, the four filters still have to be mapped to each of the sixteen ranges, using a certain number of bits for each range. If, however, a filter set has a maximum of eight filters, then the four filters only need to be mapped to eight ranges, which may require fewer bits. Additionally, using filter description syntax to identify a maximum number of filters may also improve storage of an activity metric filter index at a decoder by enabling the decoder to store the activity metric filter index using fewer bits, and thus allocate less memory to storing activity metric filter indexes Other types of filter description syntax may also be used. For example, filter description syntax describing a shape of a filter may be transmitted from encoder to decoder. By using filter description syntax to convey a shape of filters to be used in a set of filters, filter unit 349 can utilize filters of different shapes when the different shapes improve either compression ratio or reconstructed video quality. For example, in some instances, filter unit 349 may include a set of 9×9 filters, but in instances where 9×9 filters do not appreciably improve coding performance, filter unit 349 may utilize a set of 9×5 filters instead. By using 9×5 filters, fewer bits are needed to transmit filter coefficients from encoder to decoder.

Additionally, the techniques of this disclosure may exploit the fact that some of the filter coefficients defined or selected by FSU 353 may be very similar to other filter coefficients applied with respect to the pixels of coded units of another frame or slice. The same type of filter may be applied for different frames or slices (e.g., the same filter support), but the filters may be different in terms of filter coefficient values associated with the different indices of the filter support. Accordingly, in order to reduce the amount of data needed to convey such filter coefficients, filter unit 349 may predictively encode one or more filter coefficients to be used for filtering based on the filter coefficients of another coded unit, exploiting any similarities between the filter coefficients. In some cases, however, it may be more desirable to encode the filter coefficients directly, e.g., without using any prediction. Various techniques, such as techniques that exploit the use of an activity metric to define when to encode the filter coefficients using predictive coding techniques and when to encode the filter coefficients directly without any predictive coding, can be used for efficiently communicating filter coefficients to a decoder. Additionally, symmetry may also be imposed so that a subset of coefficients (e.g., 5, −2, 10) known by the decoder can be used to define the full set of coefficients (e.g., 5, −2, 10, 10, −2, 5). Symmetry may be imposed in both the direct and the predictive coding scenarios.

Figure 4:
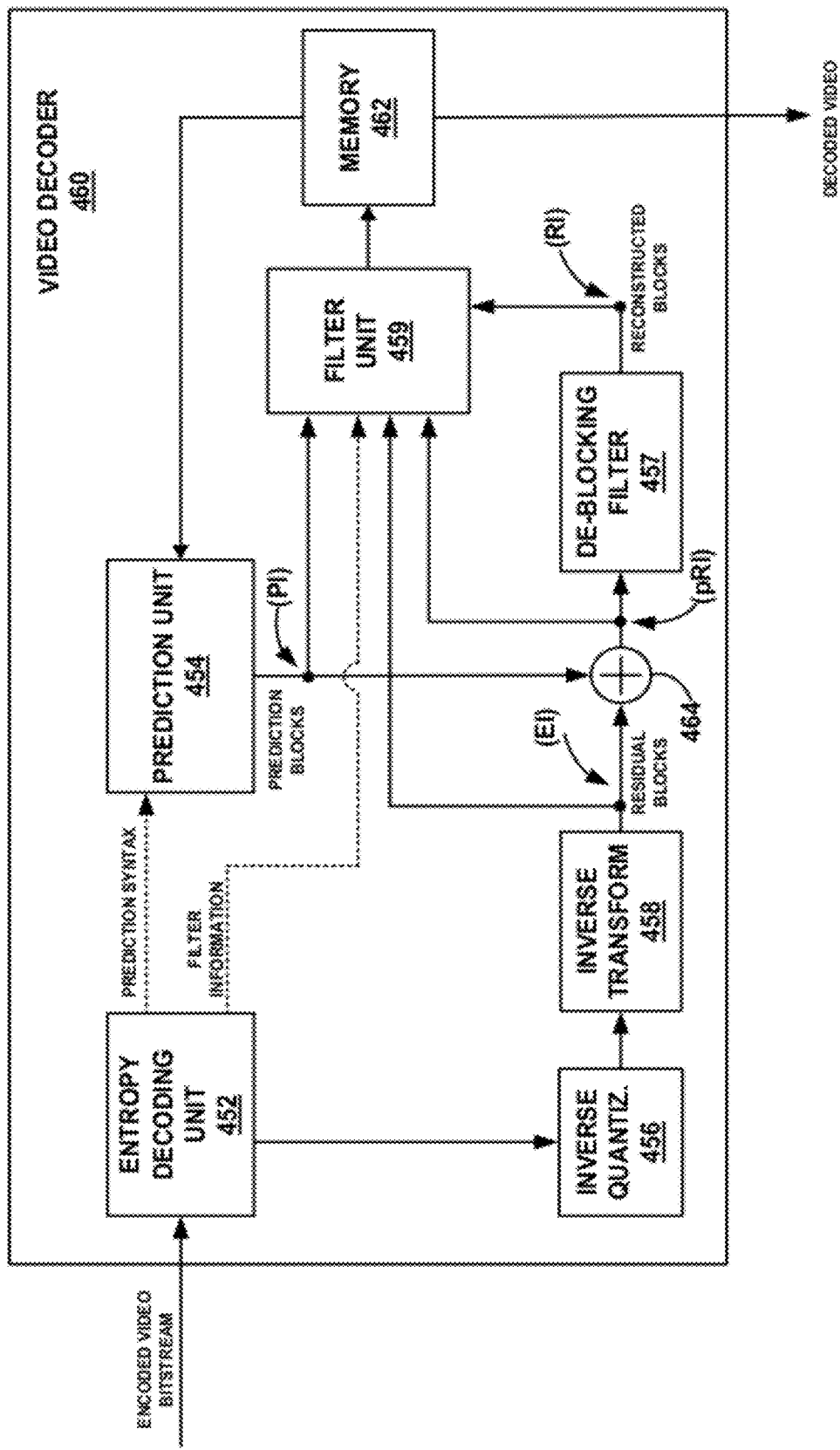
FIG. 4 is a block diagram illustrating an exemplary video decoder consistent with this disclosure.

FIG. 4 is a block diagram illustrating an example of a video decoder 460, which decodes a video sequence that is encoded in the manner described herein. The received video sequence may comprise an encoded set of image frames, a set of frame slices, a commonly coded group of pictures (GOPs), or a wide variety of types of series of video blocks that include encoded video blocks and syntax to define how to decode such video blocks.

Video decoder 460 includes an entropy decoding unit 452, which performs the reciprocal decoding function of the encoding performed by entropy encoding unit 346 of FIG. 3. In particular, entropy decoding unit 452 may perform CAVLC or CABAC decoding, or any other type of entropy decoding used by video encoder 350. Entropy decoded video blocks in a one-dimensional serialized format may be inverse scanned to convert one or more one-dimensional vectors of coefficients back into a two-dimensional block format. The number and size of the vectors, as well as the scan order defined for the video blocks may define how the two-dimensional block is reconstructed. Entropy decoded prediction syntax may be sent from entropy decoding unit 452 to prediction unit 454, and entropy decoded filter information may be sent from entropy decoding unit 452 to filter unit 459.

Video decoder 460 also includes a prediction unit 454, an inverse quantization unit 456, an inverse transform unit 458, a memory and a summer 464. In addition, video decoder 460 also includes a de-blocking filter 457 that filters the output of summer 464. Consistent with this disclosure, filter unit 459 may receive entropy decoded filter information that includes one or more filters to be applied to one or more inputs. Although not shown on FIG. 4, de-blocking filter 457 may also receive entropy decoded filter information that includes one or more filters to be applied.

The filters applied by filter unit 459 may be defined by sets of filter coefficients. Filter unit 459 may be configured to generate the sets of filter coefficients based on the filter information received from entropy decoding unit 452. The filter information may include filter description syntax that identifies a maximum number of filters in a set of filters and/or a shape of filters in a set of filters. The filter description syntax can be included in a header of a series of video blocks, e.g., an LCU header, a frame header, a slice header, a GOP header, a sequence header, or the like. In other examples, the filter description syntax might be included in a footer or other data structure. Based on the filter description syntax, filter unit 459 can reconstruct the set of filters used at the encoder.

By using filter description syntax to signal a number of filters to be included in a set of filters, as described in this disclosure, overall coding performance may be improved by enabling filter unit 459 to utilize a large number of filters when a large number of filters improves either compression rate or reconstructed video quality, but also allows filter unit 459 to utilize a smaller number of filters when a larger number of filters provides no benefit or only provides minimal benefit. Utilizing a smaller number of filters may also reduce the amount of memory video decoder 460 must allocate to storing activity metric filter indexes. Fewer filters and a smaller activity-metric filter index may improve decoder performance by reducing the amount of necessary memory and improving the speed of accessing data from memory.

Other types of filter description syntax may also be used. For example, filter description syntax describing a shape of a filter may be transmitted to video decoder 460. By using filter description syntax to convey to video decoder 460 a shape of filters to be used in a set of filters, filter unit 459 can utilize filters of different shapes when the different shapes improve either compression ratio or reconstructed video quality. For example, in some instances, a set of filters may include 9×9 filters, but in instances where 9×9 filters do not appreciably improve coding performance, 9×5 filters might be used instead. By using 9×5 filters instead of 9×9, the overall performance of video decoder 460 may be improved. In particular, filter unit 459 typically reads pixel values from memory row-by-row, thus using filters with a reduced number of rows can reduce the number of memory reads required by filter unit 459 to perform a particular filtering operation.

The filter information may also include additional signaling syntax that signals to the decoder the manner of encoding used for any given set of coefficients. In some implementations, the filter information may for example, also include activity metric ranges for which any given set of coefficients should be used. Following decoding of the filters, filter unit 459 can filter the pixel values of decoded video blocks based on the one or more sets of filter coefficients and the signaling syntax that includes activity metric ranges for which the different sets of filter coefficients should be used. The activity metric ranges may be defined by a set of activity values that define the ranges of activity metrics used to define the type of encoding used (e.g., predictive or direct).

Filter unit 459 may receive in the bit stream a set of filters for each frame or slice. For each coded unit within the frame or slice, filter unit 459 can calculate one or more activity metrics associated with the decoded pixels of a coded unit for multiple inputs (i.e. PI, EI, pRI, and RI) in order to determine which filter(s) of the set(s) to apply to each input.

Alternatively, filter unit 459 may calculate an activity metric for a single input, such as pRI or RI. For a first range of the activity metric, filter unit 459 may apply a first filter, for a second range of the activity metric filter unit 459 may apply a second filter, and so on. In some implementations four ranges may map to four different filters, although any number of ranges and filters may be used. The filter may generally assume any type of filter support shape or arrangement. The filter support refers to the shape of the filter with respect to a given pixel being filtered, and the filter coefficients may define weighting applied to neighboring pixel values according to the filter support. According to the techniques of the present disclosure, filter description syntax may be included in the bitstream along with filter coefficient information as described herein. Other syntax data included in the bitstream may signal to the decoder how the filters were encoded (e.g., how the filter coefficients were encoded), as well as the ranges of the activity metric for which the different filters should be used.

Prediction unit 454 receives prediction syntax (such as motion vectors) from entropy decoding unit 452. Using the prediction syntax, prediction unit 454 generates the prediction blocks that were used to code video blocks. Inverse quantization unit 456 performs inverse quantization, and inverse transform unit 458 performs inverse transforms to change the coefficients of the residual video blocks back to the pixel domain. Adder 464 combines each prediction block with the corresponding residual block output by inverse transform unit 458 in order to reconstruct the video block.

Filter unit 459 generates the filter coefficients to be applied for each input of a coded unit, and then applies such filter coefficients in order to filter the reconstructed video blocks of that coded unit. The filtering, for example, may comprise additional deblock filtering that smoothes edges and/or eliminates artifacts associated with video blocks, denoise filtering to reduce quantization noise, or any other type of filtering that can improve coding quality. The filtered video blocks are accumulated in memory 462 in order to reconstruct decoded frames (or other decodable units) of video information. The decoded units may be output from video decoder 460 for presentation to a user, but may also be stored for use in subsequent predictive decoding.

In the field of video coding, it is common to apply filtering at the encoder and decoder in order to enhance the quality of a decoded video signal. Filtering can be applied via a post-filter, in which case the filtered frame is not used for prediction of future frames. Alternatively, filtering can be applied "in-loop," in which case the filtered frame may be used to predict future frames. A desirable filter can be designed by minimizing the error between the original signal and the decoded filtered signal. Typically, such filtering has been based on applying one or more filters to a reconstructed image. For example, a deblocking filter might be applied to a reconstructed image prior to the image being stored in memory, or a deblocking filter and one additional filter might be applied to a reconstructed image prior to the image being stored in memory. Techniques of the present disclosure include the application of filters to inputs other than just a reconstructed image. Additionally, as will be discussed more below, filters for those multiple inputs can be selected based on Laplacian filter indexing.

In a manner similar to the quantization of transform coefficients, the coefficients of the filter h(k,l), where k=−K, . . . , K, and l=−L, . . . , L may also be quantized. K and L may represent integer values. The coefficients of filter h(k,l) may be quantized as:

$$f(k,l) = \text{round}(\text{normFact} \cdot h(k,l))$$

where normFact is a normalization factor and round is the rounding operation performed to achieve quantization to a desired bit-depth. Quantization of filter coefficients may be performed by filter unit 349 of FIG. 3 during the encoding, and de-quantization or inverse quantization may be performed on decoded filter coefficients by filter unit 459 of FIG. 4. Filter h(k,l) is intended to generically represent any filter. For example, filter h(k,l) could be applied to any one of multiple inputs. In some instances multiple inputs associated with a video block will utilize different filters, in which case multiple filters similar to h(k,l) may be quantized and de-quantized as described above.

The quantized filter coefficients are encoded and sent from source device associated with encoder 350 to a destination device associated with decoder 460 as part of an encoded bitstream. In the example above, the value of normFact is usually equal to 2n although other values could be used. Larger values of normFact lead to more precise quantization such that the quantized filter coefficients f(k, l) provide better performance. However, larger values of normFact may produce coefficients f(k, l) that require more bits to transmit to the decoder.

At decoder 460 the decoded filter coefficients f(k,l) may be applied to the appropriate input. For example, if the decoded filter coefficients are to be applied to RI, the filter coefficients may be applied to the post-deblocked reconstructed image RI(i,j), where i=0, . . . , M and j=0, . . . , N as follows:

$$\tilde{RI}(i,j) = \sum_{k=-K}^{K} \sum_{l=-L}^{L} f(k,l) RI(i+k, j+l) \bigg/ \sum_{k=-K}^{K} \sum_{l=-L}^{L} f(k,l)$$

The variables M, N, K and L may represent integers. K and L may define a block of pixels that spans two-dimensions from −K to K and from −L to L. Filters applied to other inputs can be applied in an analogous manner.

The techniques of this disclosure may improve the performance of a post-filter or in-loop filter, and may also reduce number of bits needed to transmit filter coefficients f(k, l). In some cases, a number of different post-filters or in-loop filters are transmitted to the decoder for each series of video block, e.g., for each frame, slice, portion of a frame, group of frames (GOP), or the like. For each filter, additional information is included in the bitstream to identify the coded units, macroblocks and/or pixels for which a given filter should be applied.

The frames may be identified by frame number and/or frame type (e.g., I-frames, P-frames or B-frames). I-frames refer to intra-frames that are intra-predicted. P-frames refer to predictive frames that have video blocks predicted based on one list of data (e.g., one previous frame). B-frames refer to bidirectional predictive frames that are predicted based on two lists of data (e.g., a previous and subsequent frame). Macroblocks can be identified by listing macroblock types and/or range of quantization parameter (QP) values use to reconstruct the macroblock.

The filter information may also indicate that only pixels for which the value of a given measure of local characteristic of an image, called an activity metric, is within specified range should be filtered with a particular filter. For example, for pixel (i,j) the activity metric may comprise a sum-modified Laplacian value calculated as follows:

$$\text{var}(i, j) = \sum_{k=-K}^{K} \sum_{l=-L}^{L} |2R(i+k, j+l) - R(i+k-1, j+l) - R(i+k+1, j+l)| + $$

$$|2R(i+k, j+l) - R(i+k, j+l-1) - R(i+k, j+l+1)|$$

wherein k represents a value of a summation of pixel values from −K to K and l represents a value of a summation from −L to L for a two-dimensional window that spans from −K to K and −L to L, wherein i and j represent pixel coordinates of the pixel data, RI(i,j) represents a given pixel value at coordinates i and j, and var(i,j) is the activity metric. An activity metric may similarly be found for pRI(i,j), PI(i,j), and EI(i,j). As discussed above, a sum-modified Laplacian value is one commonly used type of activity metric, but it is contemplated that the techniques of this invention may be used in conjunction with other types of activity metrics or combinations of activity metrics. Additionally, as discussed above, rather than using an activity metric to select a filter on a pixel-by-pixel basis, an activity metric may also be used to select a pixel on a group-by-group basis, where for example, a group of pixels is a 2×2 or 4×4 block.

Filter coefficients f(k, l), for any input, may be coded using prediction from coefficients transmitted for previous coded units. For each input of a coded unit m (e.g., each frame, slice or GOP), the encoder may encode and transmit a set of M filters:

$g_i^m$, wherein $i=0, \ldots, M-1$.

For each filter, the bitstream may be encoded to identify a range of values of activity metric value var for which the filter should be used.

For example, filter unit 349 of encoder 350 may indicate that filter:

$g_0^m$ should be used for pixels for which activity metric value var is within interval $[0, \text{var}_0)$, i.e., $\text{var} \geq 0$ and $\text{var} < \text{var}_0$. Furthermore, filter unit 349 of encoder 350 may indicate that filter:

$g_i^m$ where $i=1, \ldots, M-2$, should be used for pixels for which activity metric value var is within interval $[\text{var}_{i-1}, \text{var}_i)$. In addition, filter unit 349 of encoder 350 may indicate that filter:

$g_{M-1}^m$ should be used for pixels for which the activity metric var when $\text{var} > \text{var}_{M-2}$. As described above, filter unit 349 may use one set of filters for all inputs, or alternatively, may use a unique set of filters for each input.

The filter coefficients can be predicted using reconstructed filter coefficients used in a previous coded unit. The previous filter coefficients may be represented as:

$f_i^n$ where $i=0, \ldots, N-1$,

In this case, the number of the coded unit n may be used to identify one or more filters used for prediction of the current filters, and the number n may be sent to the decoder as part of the encoded bitstream. In addition, information can be encoded and transmitted to the decoder to identify values of the activity metric var for which predictive coding is used.

For example, assume that for a currently coded frame m, coefficients:

$g_r^m$ are transmitted for the activity metric values $[\text{var}_{r-1}, \text{var}_r)$. The filter coefficients of the frame m are predicted from filter coefficients of the frame n. Assume that filter $f_s^n$ is used in frame n for pixels for which the activity metric is within an interval $[\text{var}_{s-1}, \text{var}_s)$ where $\text{var}_{s-1} = \text{var}_{r-1}$ and $\text{var}_s > \text{var}_r$. In this case, interval $[\text{var}_{r-1}, \text{var}_r)$ is contained within interval $[\text{var}_{s-1}, \text{var}_s)$. In addition, information may be transmitted to the decoder indicating that prediction of filter coefficients should be used for activity values $[\text{var}_{t-1}, \text{var}_t)$ but not for activity values $[\text{var}_t, \text{var}_{t+1})$ where $\text{var}_{t-1} = \text{var}_{r-1}$ and $\text{var}_{t+1} = \text{var}_r$.

Figure 5:
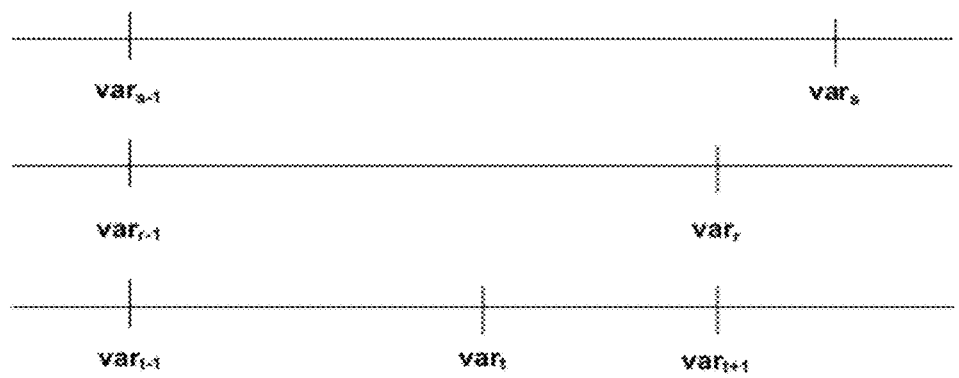
FIG. 5 is a conceptual diagram illustrating ranges of values for an activity metric.

One exemplary relationship between intervals $[\text{var}_{r-1}, \text{var}_r)$, $[\text{var}_{s-1}, \text{var}_s)$, $[\text{var}_{t-1}, \text{var}_t)$ and $[\text{var}_t, \text{var}_{t+1})$ is depicted in FIG. 5. In this case, the final values of the filter coefficients:

$f_t^m$ used to filter pixels with activity metric in the interval $[\text{var}_{t-1}, \text{var}_t)$ are equal to the sum of coefficients:

$f_s^n$ and $g_r^m$

Accordingly:

$f_t^m(k,l) = f_s^n(k,l) + g_r^m(k,l), k=-K, \ldots, K, l=-L, \ldots, L.$

In addition, filter coefficients:

$f_{t+1}^m$ that are used for pixels with activity metric $[\text{var}_t, \text{var}_{t+1})$ are equal to filter coefficients:

$g_l^m$.

Therefore:

$f_{t+1}^m(k,l) = g_r^m(k,l), k=-K, \ldots, K, l=-L, \ldots, L.$

The amplitude of the filter coefficients g(k, l) depends on k and l values. Usually, the coefficient with the biggest amplitude is the coefficient g(0,0). The other coefficients which are expected to have large amplitudes are the coefficients for which value of k or l is equal to 0. This phenomenon may be utilized to further reduce amount of bits needed to transmit the coefficients. The index values k and l may define locations within a known filter support.

The coefficients:

$g_i^m(k,l), i=0, \ldots, M-1$ for each frame m may be coded using parameterized variable length codes such as Golomb or exp-Golomb codes defined according to a parameter p. By changing the value of parameter p that defines the parameterized variable length codes, these codes can be used to efficiently represent wide range of source distributions. The distribution of coefficients g(k,l) (i.e., their likelihood to have large or small values) depends on values of k and l. Hence, to increase coding efficiency, for each frame m, the value of parameter p is transmitted for each pair (k,l). The parameter p can be used for parameterized variable length coding when encoding coefficients:

$g_i^m(k,l)$ where $k=-K, \ldots, K, l=-L, \ldots, L.$

Figure 6:
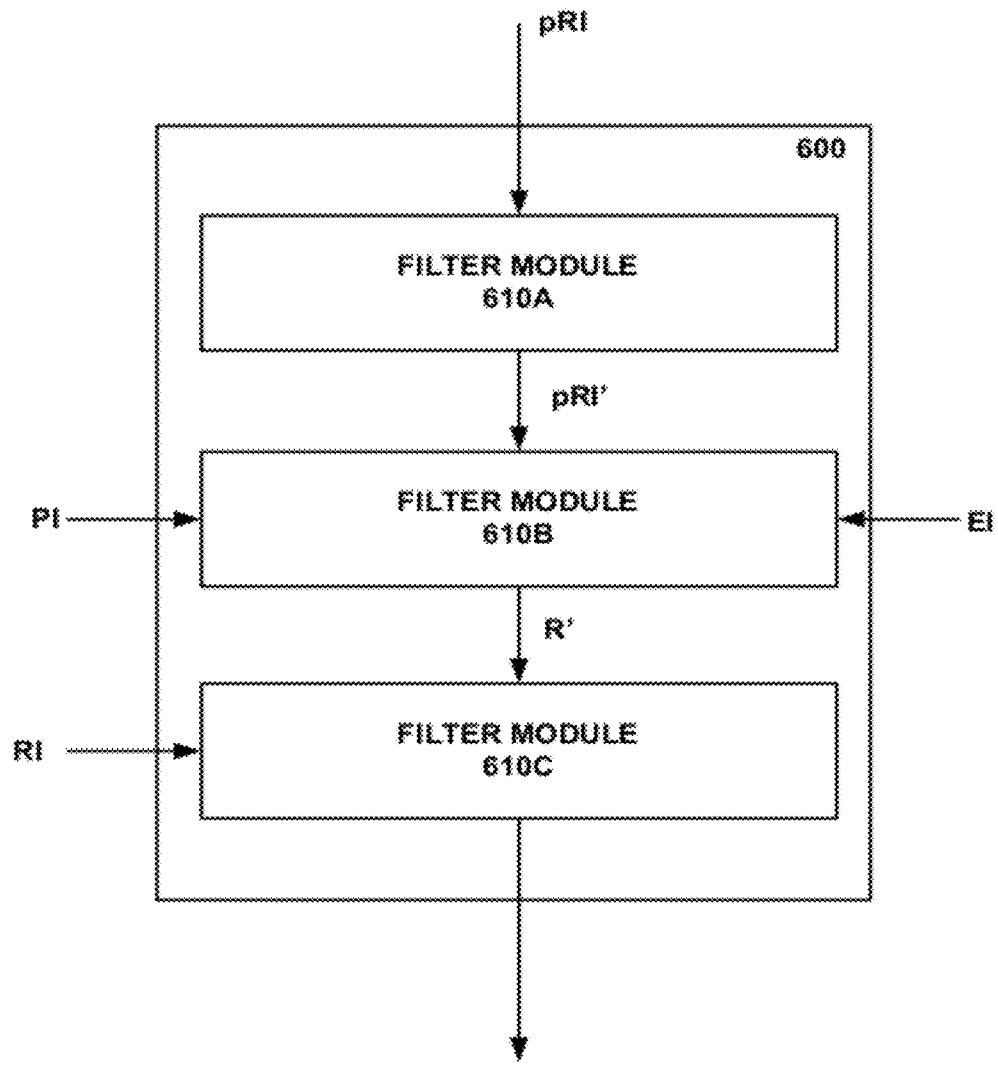
FIG. 6 is a block diagram illustrating an exemplary filter unit consistent with this disclosure.

FIG. 6 shows an example of a filter unit 600 configured to implement techniques of this disclosure. The functionality of filter unit 600 may, for example, be incorporated into filter unit 349 of FIG. 3 or filter unit 459 of FIG. 4. Filter unit 600 includes a plurality of filter modules 610A-C (collectively "filter modules 610"). Each filter module can be configured to receive one or more inputs. In this particular example, filter module 610A receives the input pRI and applies a filter to generate a filtered version of pRI, shown on FIG. 6 as pRI'. Filter module 610B receives as input pRI's, PI, and EI. Using these three inputs, Filter Module 2 610B can generate an output, shown at FIG. 6 as R', by applying the following three filters as follows:

$$R' = \sum_{i=1}^{M} w_i \cdot pRI_i + \sum_{i=1}^{N} w_{M+i} \cdot PI_i + \sum_{i=1}^{O} w_{M+N+i} \cdot EI_i$$

Filter module 610C can generate an output (R") by applying the two filters as follows:

$$R'' = \sum_{i=1}^{M} w_i \cdot R'_i + \sum_{i=1}^{N} w_{M+i} \cdot RI_i$$

By applying filters of all zeros, different outputs can be achieved. For example, if filter module 610A applies a filter of all zeros to pRI, and filter module 610B applies filters of all zeros to PI and EI, then the output of filter module 610B will similarly be zero, meaning the output of filter module 610C will simply be a filtered version of RI. In another implementation, all of the filters applied to the various inputs can be chosen from a set of filters based on an activity metric, such as via Laplacian filter indexing. As mentioned previously, the indexing of sum-modified Laplacian values for inputs to filters can be implemented in multiple ways. For example, in some implementations each input might have a unique set of filters, while in some implementations inputs share a common set of filters. Additionally, in some implementations, a sum-modified Laplacian value for each input might be used to identify a particular filter for each input. In other implementations, however, a sum-modified Laplacian value for a single input might be used to identify filters for all the inputs. In yet other implementations, a sum-modified Laplacian value for a first input might be used to identify a filter for a second, different input.

Figure 7:
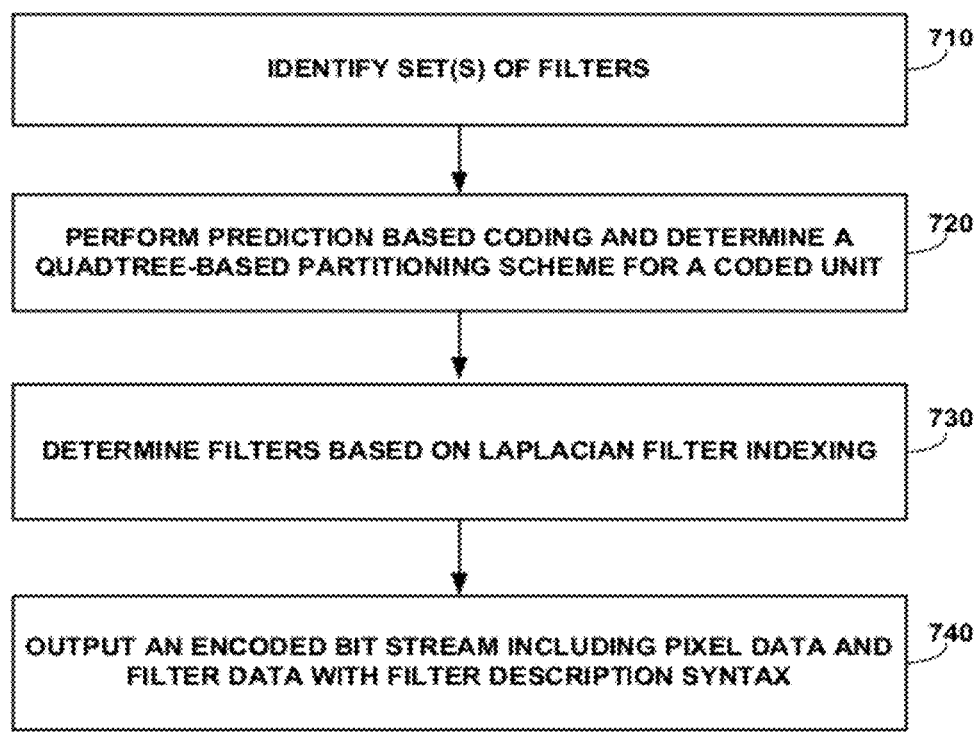
FIG. 7 is a flow diagram illustrating an encoding technique consistent with this disclosure.

FIG. 7 is a flow diagram illustrating an encoding technique consistent with this disclosure. As shown in FIG. 3, video encoder 350 encodes pixel data of a series of video blocks. The series of video blocks may comprise a frame, a slice, a group of pictures (GOP), an entire sequence of video data, or another decodable set of video data. The pixel data may be arranged in coded units, and video encoder 350 may encode the pixel data by encoding the coded units in accordance with a video encoding standard such as the HEVC standard. For a frame or slice, FSU 353 can identify a set of filters to be used for the frame or slice (710). FSU 353 may identify one set of filters for all inputs or may identify a set of filters for each input. The maximum number of filters included in the sets of filters as well as the shape of the filters in the sets of filters may be determined by FSU 353 based on some combination of reconstructed video quality, compression rate, data transmission rate, or other metrics.

As part of the video encoding process, prediction unit 332 performs prediction based coding and determines a quadtree based partitioning scheme for a particular coded unit (720).

Further, as part of the video encoding process, filter unit 349 of video encoder 350 selects, based on Laplacian filter indexing, one or more filters from the set of filters to be used for sub-coded units of the particular coded unit of the frame, slice, or LCU (730). The one or more filters may be applied to one or more inputs, as described above. This filtering may be used to improve video coding by generally making a decoded image more similar to an original image. Filter unit 349 is shown as being in-loop, which means that the filtered data is used for predictive encoding of later video blocks. However, filter unit 349 could alternatively apply post-loop filtering, in which case the unfiltered data would be used for predictive encoding of later video blocks.

Video encoder 350 outputs an encoded bitstream for the coded unit, which includes encoded pixel data and the encoded filter data with the filter description syntax (740). The encoded filter data may include signaling information for identifying the set of filters to be used and may also include signaling information that identifies how the filters were encoded and the ranges of the activity metric for which the different filters should be applied. The encoded pixel data may include among other types of data, a segmentation map for a particular coded unit.

Figure 8:
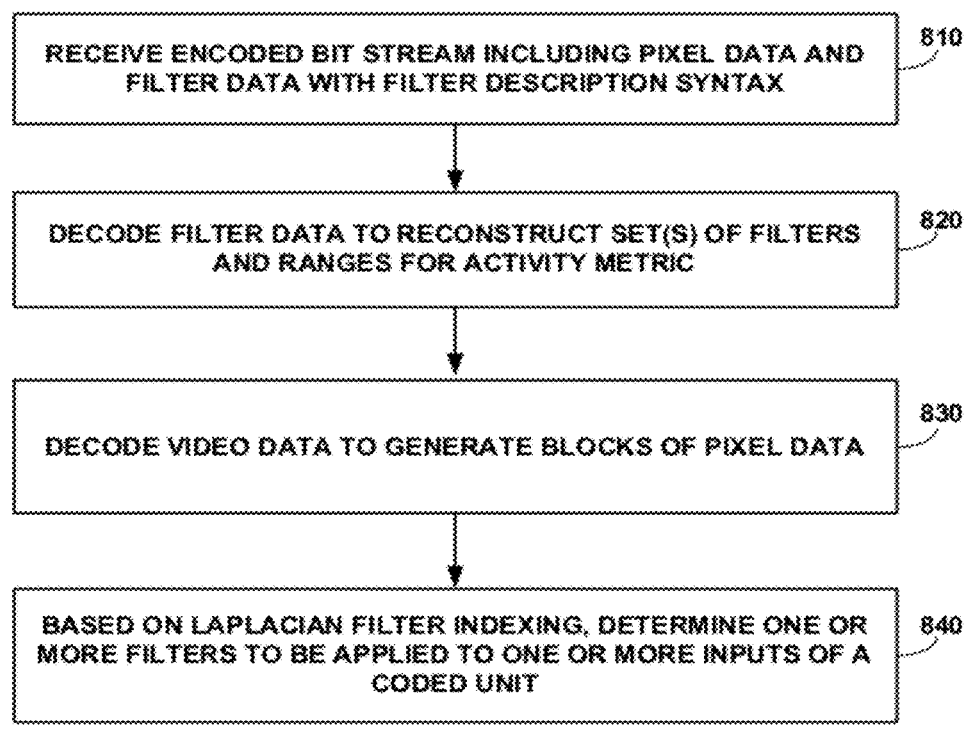
FIG. 8 is a flow diagram illustrating a decoding technique consistent with this disclosure.

FIG. 8 is a flow diagram illustrating a decoding technique consistent with this disclosure. As shown in FIG. 8, video decoder 460 receives an encoded bitstream including encoded video data and encoded filter data with filter description syntax (810). Based on the filter description syntax, video decoder 460 decodes the filter data to reconstruct one or more sets of filters as well as ranges for an activity metric for determining when to apply a particular filter from the set of filters (820). As discussed above, the filter data may include filter description syntax that signals a maximum number of filters included in a set of filters and/or a shape of the filters in the set of filters. As described above in relation to FIG. 4, the reconstruction process can produce a plurality of inputs (i.e. RI, pRI, PI, and EI) for filter unit 459. Video decoder 460 decodes the video data to generate blocks of pixel data (830). The pixel data may include, among other types of data, a segmentation map. In particular, video decoder 460 may generate pixel data by performing block-based video reconstruction consistent with a video standard such as the newly emerging HEVC standard or a similar block-based video coding standard.

Based on a segmentation map for a coded unit, video decoder 460 can determine if a sub-coded unit of the coded unit is to be filtered by filter unit 459. If a sub-coded unit is to be filtered, then filter unit 459 can determine one or more sum-modified Laplacian values for the sub-coded unit, and based on Laplacian filter indexing, filter unit 459 can identify one or more filters to be used with one or more inputs of the sub-coded unit (840).

The foregoing disclosure has been simplified to some extent in order to convey details. For example, the disclosure generally describes sets of filters being transmitted on a per-frame or per-slice basis, but sets of filters may also be transmitted on a per-sequence basis, per-group of picture basis, per-group of slices basis, per-CU basis, per-LCU basis, or other such basis. In general, filters may be transmitted for any grouping of one or more coded units. Additionally, in implementation, there may be numerous filters per input per coded unit, numerous coefficients per filter, and numerous different levels of variance with each of the filters being defined for a different range of variance. For example, in some cases there may be sixteen or more filters defined for each input of a coded unit and sixteen different ranges of variance corresponding to each filter. Additionally, when this disclosure describes transmitting filter information, it should not be assumed that all filter information is transmitted at the same coding level. For example, in some implementations, some filter information such as filter description syntax may be transmitted on a frame-by-frame basis or slice-by-slice basis while other filter information such as filter coefficients are transmitted on an LCU-by-LCU basis. Syntax at other levels of the coding hierarchy, such as sequence level, GOP-level, or other levels could also be defined for conveying some or all of such filter information Each of the filters for each input may include many coefficients. In one example, the filters comprise two-dimensional filters with 81 different coefficients defined for a filter support that extends in two-dimensions. However, the number of filter coefficients that are transmitted for each filter may be fewer than 81 in some cases. Coefficient symmetry, for example, may be imposed such that filter coefficients in one dimension or quadrant may correspond to inverted or symmetric values relative to coefficients in other dimensions or quadrants. Coefficient symmetry may allow for 81 different coefficients to be represented by fewer coefficients, in which case the encoder and decoder may assume that inverted or mirrored values of coefficients define other coefficients. For example, the coefficients (5, −2, 10, 10, −2, 5) may be encoded and transmitted as the subset of coefficients (5, −2, 10). In this case, the decoder may know that these three coefficients define the larger symmetric set of coefficients (5, −2, 10, 10, −2, 5).

The techniques of this disclosure may be implemented in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. If implemented in hardware, any features described as modules, units or components may be implemented together in an integrated logic device or separately as discrete but interoperable logic devices. If implemented in software, the techniques may be realized at least in part by a computer-readable medium comprising instructions that, when executed in a processor, performs one or more of the methods described above. The computer-readable medium may comprise a computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

Various aspects of the disclosure have been described. These and other aspects are within the scope of the following claims.

The invention claimed is:

1. A method of decoding a bitstream of encoded video data, the method comprising:
  receiving in the bitstream of encoded video data as part of a higher level coded unit, at a video decoder comprising one or more processors, a first syntax element, wherein a value of the first syntax element identifies a maximum number of filters allowed in a set of filters for a series of video blocks;
  receiving, in the bitstream of encoded video data as part of a lower level coded unit, at the video decoder, a second syntax element, wherein a value of the second syntax element identifies a number of filters in the set of filters for the series of video blocks, wherein the number of filters in the set of filters is less than the maximum number of filters, wherein the higher level coded unit is hierarchically higher than the lower level coded unit;
  reconstructing the set of filters based on the value of the first syntax element and the value of the second syntax element;
  determining a mapping of ranges of an activity metric to filters in the set of filters based on the value of the first syntax element, wherein a number of ranges of the activity metric to be mapped to filters in the set of filters is a function of the maximum number of filters allowed in the set of filters as indicated by the value of the first syntax element;
  generating a reconstructed block from a predictive block in a reference frame and a residual block;
  determining a value of an activity metric for the reconstructed block;
  selecting a filter from the set of filters based on the determined value of the activity metric and the mapping of the ranges of the activity metric to the filters in the set of filters;
  applying the filter to samples of the reconstructed block of video as part of a loop filtering operation; and
  outputting decoded video data comprising the filtered reconstructed block of video.

2. The method of claim 1, further comprising:
  allocating a portion of memory to storing filters based on the value of the first syntax element.

3. The method of claim 1, wherein the video decoder implements a Quadtree-based Adaptive Loop Filter (QALF) scheme with multiple filters.

4. The method of claim 1, wherein the first syntax element is part of a header of a series of video blocks.

5. The method of claim 1, further comprising:
  receiving third syntax element, wherein a value of the third syntax element identifies a shape of filters in the set of filters;
  wherein reconstructing the set of filters is further based on the value of the third syntax element.

6. The method of claim 1, wherein the activity metric comprises a sum-modified Laplacian value.

7. The method of claim 6, wherein the sum-modified Laplacian value comprises var(i,j) defined approximately according to the following equation:

$$\text{var}(i, j) = \sum_{k=-K}^{K} \sum_{l=-L}^{L} |2R(i+k, j+l) - R(i+k-1, j+l) - R(i+k+1, j+l)| + |2R(i+k, j+l) - R(i+k, j+l-1) - R(i+k, j+l+1)|$$

wherein k represents a value of a summation from −K to K and l represents a value of a summation from −L to L for a two-dimensional window that spans from −K to K and −L to L, wherein i and j represent pixel coordinates of the pixel data, R(i,j) represents a given pixel value at coordinates i and j, and var(i,j) is the activity metric.

8. The method of claim 1, wherein the video decoder is implemented as a component of a video encoder.

9. A method of video encoding, the method comprising:
determining a maximum number of filters allowed in a set of filters for a series of video blocks;
determining a number of filters to be included in the set of filters for the series of video blocks;
determining a mapping of ranges of an activity metric to filters in the set of filters, wherein a number of ranges of the activity metric is a function of the maximum number of filters allowed in the set of filters as indicated by the value of the first syntax element;
generating for inclusion in a bitstream of encoded video data, as part of a higher level coded unit, a first syntax element, wherein a value of the first syntax element identifies the maximum number of filters;
generating for inclusion in the bitstream of encoded video data, as part of a lower level coded unit, a second syntax element, wherein a value of the second syntax element identifies the number of filters, wherein the number of filters in the set of filters is less than the maximum number of filters, wherein the higher level coded unit is hierarchically higher than the lower level coded unit; and
outputting the bitstream of encoded video data comprising the first syntax element, the second syntax element, the set of filters, and for each range of the ranges of the activity metric, information for mapping the range of the activity metric to a filter in the set of filters;
as part of a decoding loop:
generating a reconstructed block from a predictive block in a reference frame and a residual block;
determining a value of an activity metric for the reconstructed block;
selecting a filter from the set of filters based on the determined value of the activity metric and the mapping of the ranges of the activity metric to the filters in the set of filters;
applying the filter to samples of the reconstructed block of video.

10. The method of claim 9, wherein the video encoder implements a Quadtree-based Adaptive Loop Filter (QALF) scheme with multiple filters.

11. The method of claim 9, wherein the first syntax element is part of a header of a series of video blocks.

12. The method of claim 9, further comprising:
determining a shape of filters to be used for the set of filters;
generating a third syntax element identifying the shape of filters in the set of filters; and
including the third syntax element in the bitstream.

13. A video decoding device comprising:
a memory storing a bitstream of encoded video data;
a video decoder comprising one or more processors configured to:
receive the bitstream of encoded video data;
receive, in the bitstream of encoded video data as part of a higher level coded unit, a first syntax element, wherein a value of the first syntax element identifies a maximum number of filters allowed in a set of filters for a series of video blocks;
receive, in the bitstream of encoded video data as part of a lower level coded unit, a second syntax element, wherein a value of the second syntax element identifies a number of filters in the set of filters for the series of video blocks, wherein the number of filters in the set of filters is less than the maximum number of filters, wherein the higher level coded unit is hierarchically higher than the lower level coded unit;
reconstruct the set of filters based on the first syntax element and the second filter description;
determine a mapping of ranges of an activity metric to filters in the set of filters based on the syntax element, wherein a number of ranges of the activity metric to be mapped to filters in the set of filters is a function of the maximum number of filters allowed in the set of filters as indicated by the value of the first syntax element;
generate a reconstructed block from a predictive block in a reference frame and a residual block;
determine a value of an activity metric for the reconstructed block;
select a filter from the set of filters based on the determined value of the activity metric and the mapping of ranges of the activity metric to the filters in the set of filters;
apply the filter to samples of the reconstructed block of video as part of a loop filtering operation; and
output decoded video data comprising the filtered reconstructed block of video data.

14. The video decoding device of claim 13, wherein the one or more processors are further configured to allocate a portion of memory to storing filters based on the value of the first syntax element.

15. The video decoding device of claim 13, wherein the video decoding device implements a Quadtree-based Adaptive Loop Filter (QALF) scheme with multiple inputs.

16. The video decoding device of claim 13, wherein the first syntax element is part of a header of a series of video blocks.

17. The video decoding device of claim 13, wherein the one or more processors are further configured to:
receive third syntax element, wherein a value of the third syntax element identifies a shape of filters in the set of filters; and
reconstructing the set of filters based on the third syntax element.

18. The video decoding device of claim 13, wherein the activity metric comprises a sum-modified Laplacian value.

19. The video decoding device of claim 18, wherein the sum-modified Laplacian value comprises var(i,j) defined approximately according to the following equation:

$$\text{var}(i, j) =$$

$$\sum_{k=-K}^{K} \sum_{l=-L}^{L} |2R(i+k, j+l) - R(i+k-1, j+l) - R(i+k+1, j+l)| +$$

$$|2R(i+k, j+l) - R(i+k, j+l-1) - R(i+k, j+l+1)|$$

wherein k represents a value of a summation from −K to K and 1 represents a value of a summation from −L to L for a two-dimensional window that spans from −K to K and −L to L, wherein i and j represent pixel coordinates of the pixel data, R(i,j) represents a given pixel value at coordinates i and j, and var(i,j) is the activity metric.

20. A video encoding device comprising:
   a memory storing video data;
   a video encoder comprising one or more processors configured to:
      determine a maximum number of filters allowed in a set of filters for a series of video blocks;
      determine a number of filters to be included in the set of filters for the series of video blocks;
      determine a mapping of ranges of an activity metric to filters in the set of filters, wherein a number of ranges of the activity metric is a function of the maximum number of filters allowed in the set of filters as indicated by the value of the first syntax element;
      generate for inclusion in a bitstream of encoded video data, as part of a higher level coded unit, a first syntax element, wherein a value of the first syntax element identifies the maximum number of filters;
      generate for inclusion in a bitstream of encoded video data, as part of a lower level coded unit, a second syntax element, wherein a value of the second syntax element identifies the number of filters, wherein the number of filters in the set of filters is less than the maximum number of filters, wherein the higher level coded unit is hierarchically higher than the lower level coded unit; and
   output the bitstream of encoded video data comprising the first syntax element, the second syntax element, the set of filters, and for each range of the ranges of the activity metric, information for mapping the range of the activity metric to a filter in the set of filters; and
   as part of a decoding loop:
      generate a reconstructed block from a predictive block in a reference frame and a residual block;
      determine a value of an activity metric for the reconstructed block;
      select a filter from the set of filters based on the determined value of the activity metric and the mapping of the ranges of the activity metric to the filters in the set of filters;
      apply the filter to samples of the reconstructed block of video.

21. The video encoding device of claim 20, wherein the one or more processors are configured to implement a Quadtree-based Adaptive Loop Filter (QALF) scheme with multiple inputs.

22. The video encoding device of claim 20, wherein the first syntax element is part of a header of a series of video blocks.

23. The video encoding device of claim 20, wherein the one or more processors are further configured to:
   determine a shape of filters to be used for the set of filters;
   generate a third syntax element, wherein a value of the third syntax element identifies the shape of filters in the set of filters; and
   including the third syntax element in the bitstream.

24. A non-transitory computer-readable storage medium having stored thereon instructions that, when executed, cause one or more processors of a device for decoding video data to:
   receive a bitstream of encoded video data;
   receive in the bitstream of encoded video data as part of a higher level coded unit, at a video decoder, first syntax element, wherein a value of the first syntax element identifies a maximum number of filters allowed in a set of filters for a series of video blocks;
   receive, in the bitstream of encoded video data as part of a lower level coded unit, at the video decoder, second syntax element, wherein a value of the second syntax element identifies a number of filters in the set of filters for the series of video blocks, wherein the number of filters in the set of filters is less than the maximum number of filters, wherein the higher level coded unit is hierarchically higher than the lower level coded unit;
   reconstruct the set of filters based on the first syntax element and the second syntax element;
   determine a mapping of ranges of an activity metric to filters in the set of filters based on the first syntax element, wherein a number of ranges of the activity metric to be mapped to filters in the set of filters is a function of the maximum number of filters allowed in the set of filters as indicated by the value of the first syntax element;
   generate a reconstructed block from a predictive block in a reference frame and a residual block;
   determine a value of an activity metric for the reconstructed block;
   select a filter from the set of filters based on the determined value of the activity metric and the mapping of the ranges of the activity metric to the filters in the set of filters;
   apply the filter to samples of the reconstructed block of video as part of a loop filtering operation; and
   output decoded video data comprising the filtered reconstructed block of video.

25. The non-transitory, computer-readable storage medium of claim 24, further comprising instructions that cause the one or more processors to allocate a portion of memory to storing filters based on the first syntax element.

26. The non-transitory, computer-readable storage medium of claim 24, wherein the device for video decoding video data implements a Quadtree-based Adaptive Loop Filter (QALF) scheme with multiple filters.

27. The non-transitory, computer-readable storage medium of claim 24, wherein the first syntax element is part of a header of a series of video blocks.

28. The non-transitory, computer-readable storage medium of claim 24, further comprising instructions that cause the one or more processors to:
   receive a third syntax element, wherein a value of the third syntax element identifies a shape of filters in the set of filters;
   wherein reconstructing the set of filters is further based on the third syntax element.

29. The non-transitory, computer-readable storage medium of claim 24, wherein the activity metric comprises a sum-modified Laplacian value.

30. The non-transitory, computer-readable storage medium of claim 29, wherein the sum-modified Laplacian value comprises var(i,j) defined approximately according to the following equation:

$$var(i, j) = \sum_{k=-K}^{K} \sum_{l=-L}^{L} |2R(i+k, j+l) - R(i+k-1, j+l) - R(i+k+1, j+l)| + |2R(i+k, j+l) - R(i+k, j+l-1) - R(i+k, j+l-1)|$$

wherein k represents a value of a summation from −K to K and l represents a value of a summation from −L to L for a two-dimensional window that spans from −K to K and −L to L, wherein i and j represent pixel coordinates of the pixel data, R(i,j) represents a given pixel value at coordinates i and j, and var(i,j) is the activity metric.

31. The non-transitory, computer-readable storage medium of claim 24, wherein the device for video decoding video data is implemented as a component of a video encoder.

32. A non-transitory, computer-readable storage medium having stored thereon instructions that, when executed, cause one or more processors of a device for encoding video data to:
   determine a maximum number of filters allowed in a set of filters for a series of video blocks;
   determine a number of filters to be included in the set of filters for the series of video blocks;
   determine a mapping of ranges of an activity metric to filters in the set of filters, wherein a number of ranges of the activity metric is a function of the maximum number of filters allowed in the set of filters as indicated by the value of the first syntax element;
   generate for inclusion in a bitstream of encoded video data, as part of a higher level coded unit, a first syntax element, wherein a value of the first syntax element identifies the maximum number of filters;
   generate for inclusion in the bitstream of encoded video data, as part of a lower level coded unit, a second syntax element, wherein a value of the second syntax element identifies the number of filters, wherein the number of filters in the set of filters is less than the maximum number of filters, wherein the higher level coded unit is hierarchically higher than the lower level coded unit; and
   output the bitstream of encoded video data comprising the first syntax element, the second syntax element, the set of filters, and for each range of the ranges of the activity metric, information for mapping the range of the activity metric to a filter in the set of filters; and as part of a decoding loop:
   generate a reconstructed block from a predictive block in a reference frame and a residual block;
   determine a value of an activity metric for the reconstructed block;
   select a filter from the set of filters based on the determined value of the activity metric and the mapping of the ranges of the activity metric to the filters in the set of filters;
   apply the filter to samples of the reconstructed block of video.

33. The non-transitory, computer-readable storage medium of claim 32, wherein the device for encoding video data implements a Quadtree-based Adaptive Loop Filter (QALF) scheme with multiple filters.

34. The non-transitory, computer-readable storage medium of claim 32, wherein the first syntax element is part of a header of a series of video blocks.

35. The non-transitory, computer-readable storage medium of claim 32, further comprising instructions that cause the one or more processors to:
   determine a shape of filters to be used for the set of filters;
   generate a third syntax element, wherein a value of the third syntax element identifies the shape of filters in the set of filters; and
   signal the third syntax element in the bitstream.

36. The method of claim 1, further comprising:
   receiving the encoded video data at a receiver of a wireless communication device;
   storing the encoded video data in a memory of the wireless communication device; and
   processing the encoded video data on one or more processors of the wireless communication device.

37. The method of claim 36, wherein the wireless communication device comprises a telephone handset and wherein receiving the video data at the receiver of the wireless communication device comprises demodulating, according to a wireless communication standard, a signal comprising the encoded video data.

38. The device of claim 13, wherein the device comprises a wireless communication device comprising a receiver configured to receive encoded video data.

39. The device of claim 38, wherein the wireless communication device comprises a telephone handset and wherein the receiver is configured to demodulate, according to a wireless communication standard, a signal comprising the encoded video data.

40. The method of claim 1, wherein the higher level coded unit comprises one of a sequence parameter set or a picture parameter set.

41. The method of claim 1, wherein the lower level coded unit comprises one of a slice header or a largest coding unit.

42. The method of claim 9, wherein the higher level coded unit comprises one of a sequence parameter set or a picture parameter set.

43. The method of claim 9, wherein the lower level coded unit comprises one of a slice header or a largest coding unit.

* * * * *